(12) United States Patent
Kanayama

(10) Patent No.: US 9,511,672 B2
(45) Date of Patent: Dec. 6, 2016

(54) CHARGE DEVICE AND IN-VEHICLE APPARATUS

(71) Applicant: DENSO CORPORATION, Kariya, Aichi-pref. (JP)

(72) Inventor: Mitsuhiro Kanayama, Takahama (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 159 days.

(21) Appl. No.: 14/605,094

(22) Filed: Jan. 26, 2015

(65) Prior Publication Data

US 2015/0210172 A1 Jul. 30, 2015

(30) Foreign Application Priority Data

Jan. 28, 2014 (JP) ................................. 2014-013260

(51) Int. Cl.
| | |
|---|---|
| *H02J 7/00* | (2006.01) |
| *B60L 11/18* | (2006.01) |
| *B60R 16/023* | (2006.01) |
| *H04B 3/54* | (2006.01) |
| *H04L 12/10* | (2006.01) |
| *H04L 12/24* | (2006.01) |
| *H04L 29/08* | (2006.01) |

(52) U.S. Cl.
CPC .......... *B60L 11/1809* (2013.01); *B60R 16/023* (2013.01); *H02J 7/007* (2013.01); *H02J 7/0042* (2013.01); *H02J 7/0052* (2013.01); *H04B 3/544* (2013.01); *H04L 12/10* (2013.01); *H04L 41/0672* (2013.01); *H04L 67/125* (2013.01); *H02J 2007/0095* (2013.01); *H02J 2007/0096* (2013.01)

(58) Field of Classification Search
CPC ...................................................... Y02T 90/14
USPC ......................................................... 320/109
See application file for complete search history.

(56) References Cited

U.S. PATENT DOCUMENTS

| | | | |
|---|---|---|---|
| 2009/0174365 A1* | 7/2009 | Lowenthal | ......... B60L 11/1816 |
| | | | 320/109 |
| 2012/0007554 A1* | 1/2012 | Kanamori | .......... B60L 11/1824 |
| | | | 320/109 |
| 2012/0274278 A1* | 11/2012 | Igata | ..................... H04B 3/542 |
| | | | 320/109 |

(Continued)

FOREIGN PATENT DOCUMENTS

| | | |
|---|---|---|
| JP | 2013-059176 | 3/2013 |
| JP | 2013-090421 | 5/2013 |
| JP | 2015-119586 | 6/2015 |

OTHER PUBLICATIONS

Office Action dated Feb. 23, 2016 in the corresponding Japanese Application No. 2014-13260 with English translation.

*Primary Examiner* — Suresh Memula
(74) *Attorney, Agent, or Firm* — Harness, Dickey & Pierce, P.L.C.

(57) ABSTRACT

A vehicle charge device performs a pilot communication and an in-band communication via communication lines that are integrated with electric power lines in a charge cable. The charge device includes a master controller that resets a slave controller of an in-band communicator if determined that the charge cable is pulled out from a connector of a vehicle. As a result, the system suffers less frequent in-band communication errors during which an in-band communication is disabled due to a malfunction of a computer for the in-band communication.

14 Claims, 11 Drawing Sheets

(56) References Cited

U.S. PATENT DOCUMENTS

| | | | |
|---|---|---|---|
| 2013/0026988 A1* | 1/2013 | Igata | B60L 11/1811 320/109 |
| 2015/0022151 A1* | 1/2015 | Tabatowski-Bush | B60L 11/1846 320/109 |
| 2015/0022152 A1* | 1/2015 | Nakagawa | B60L 11/1838 320/109 |
| 2016/0031338 A1* | 2/2016 | Penilla | B60L 11/1824 320/109 |

* cited by examiner

CHARGE DEVICE AND IN-VEHICLE APPARATUS

CROSS REFERENCE TO RELATED APPLICATION

The present application is based on and claims the benefit of priority of Japanese Patent Application No. 2014-013260, filed on Jan. 28, 2014, the disclosure of which is incorporated herein by reference.

TECHNICAL FIELD

The present disclosure generally relates to a charge device and an in-vehicle apparatus.

BACKGROUND INFORMATION

Conventionally, a charge device that performs a communication with a vehicle via a built-in communication line within a charge cable is known. The charge cable may also include a built-in power line to provide an electric power to the vehicle for charging a secondary battery of the vehicle.

For example, a device in a patent document 1 (i.e., Japanese Patent Laid-Open No. 2013-59176) performs a CPLT (Control Pilot Line Transmission) communication, via a communication line for an exchange of charge progress notices, notifying of charge procedures such as a connection of the charge cable, disconnection thereof, a completion of charge preparation, a start/end of charging, etc. In the present specification, a communication via communication line that is integrated with the power line in the charge cable, such as the CPLT communication for an exchange of the charge progress, is designated as a pilot communication. Further, in the disclosure of the patent document 1, it is described that the communication line used for the pilot communication is also used for an in-band communication by multiplexing an in-band signal.

The in-band communication may be performed by a more complex communication method than the pilot communication, such as an OFDM, for example, in addition to using a much higher frequency. For implementing such a complex communication method, a high processing capacity computer has to be used, in comparison to a communication circuit used for the pilot communication.

When a high processing capacity computer is used, the computer tends to suffer from noise in the in-band signal or other noise like factors, which results in frequent malfunctions of the computer. That is, when the in-band communication is required, the computer may not operate properly.

SUMMARY

It is an object of the present disclosure to provide, in view of the above, a vehicle charge system, which performs a pilot communication and an in-band communication via a charge cable, which is a communication line integrated with a power line in the charge cable, having improved in-band communication by reducing malfunctions of the computer for performing the in-band communication.

In an aspect of the present disclosure, the charge device performs a communication with a vehicle via a communication line in a charge cable, and the charge cable has a built-in power line to provide an electric power to the vehicle for charging a secondary battery of the vehicle and the built-in communication line. The charge device includes a pilot communicator that controls and detects a voltage level of the communication line for an exchange of charge progress notices with the vehicle for controlling a charge operation, an in-band communicator that sends and receives charge information to and from the vehicle via the communication line, the charge information multiplexed with other signals on the communication line, and a master controller controlling the in-band communicator, in which the master controller resets a slave controller included in the in-band communicator on/off a charge device based on a fulfillment of a preset condition regarding (i) detection contents of the pilot communicator, (ii) communication contents of the in-band communicator, or (iii) an operation state of the in-band communicator.

Further, the master controller resets the slave controller on the charge device and clears information obtained from the slave controller on the charge device based on the fulfillment of the preset condition.

Additionally, the master controller determines that the preset condition is fulfilled based on a detection of an open state of the communication line by the pilot controller.

Even further, the master controller continues to output a reset signal to reset the slave controller on the charge device while the pilot controller is detecting the open state of the communication line.

In addition, the master controller prompts a user to disconnect the charge cable based on a communication failure of the in-band communicator.

Still further, the master controller determines that the preset condition is fulfilled based on a communication failure of the in-band communicator.

Moreover, the master controller determines the communication failure of the in-band communicator when, in a case that the in-band communicator is not capable of sending information for a preset time, (i) the in-band communication is not capable of receiving information for the preset time or (ii) the in-band communication is not capable of both sending information and receiving information for the preset time.

Yet further, the master controller determines the communication failure of the in-band communicator based on a notice received from the slave controller on the charge device.

Also, the master controller sends a notice of the communication failure to an external device based on the communication failure of the in-band communicator.

Additionally, the master controller sends, after resetting the slave controller on the charge device, a reset instruction by using the in-band communicator to reset a slave controller on the vehicle that communicates with the in-band communicator in case of the communication failure of the in-band communicator.

Further, the master controller determines that the preset condition is fulfilled based on a detection of the pilot communicator that the charge cable is connected to the vehicle.

In addition, the master controller (i) determines that the preset condition is fulfilled when a communication by using the in-band communicator is detected to be in a startable state based on the detection contents of the pilot communicator, and (ii) resets the slave controller on the charge device before starting the communication by using the in-band communicator.

Even further, the master controller (i) determines that the preset condition is fulfilled when an end of the communication by using the in-band communicator is detected based on the communication contents of the in-band communicator, and (ii) resets the slave controller on the charge device before the communication line is opened.

As mentioned above, the master controller provided as a separate component from the in-band communicator resets the slave controller of the charge device which is included in the in-band communicator as required, based on the detection contents of the pilot communicator, the communication contents of the in-band communicator, or the operation state of the in-band communicator. Therefore, in a situation where the slave controller of the charge device is highly likely to be malfunctioning, or in a situation where the in-band communication is highly likely to be disabled if the slave controller of the charge device is malfunctioning, the slave controller is preemptively reset (under the control of the master controller). Thus, the frequency of disabled in-band communications due to the malfunction of the slave controller of the charge device is decreased.

Further, in other aspect, the in-vehicle apparatus communicates with a charge device on a vehicle having a secondary battery, and the communication between the in-vehicle apparatus and the charge device is performed via a communication line that is built in a charge cable together with a power line that is used for receiving an electric power for charging the secondary battery from the charge device. The in-vehicle apparatus includes a pilot communicator that controls and detects a voltage level of the communication line for an exchange of charge progress notices with the charge device for controlling a charge operation, an in-band communicator that sends and receives charge information to and from the charge device via the communication line, the charge information multiplexed with other signals on the communication line, and a master controller that controls the in-band communicator. The master controller resets a slave controller included in the in-band communicator on the vehicle based on a fulfillment of a preset condition regarding (i) detection contents of the pilot communicator, (ii) communication contents of the in-band communicator, or (iii) an operation state of the in-band communicator.

Likewise, the master controller provided as a separate component from the in-band communicator resets the slave controller of the charge device which is included in the in-band communicator as required, based on the detection contents of the pilot communicator, the communication contents of the in-band communicator, or the operation state of the in-band communicator. Therefore, in a situation where the slave controller of the charge device is highly likely to be malfunctioning, or in a situation where the in-band communication is highly likely to be disabled if the slave controller of the charge device is malfunctioning, the slave controller is preemptively reset under the control of the master controller. Thus, the frequency of disabled in-band communications due to the malfunction of the slave controller of the charge device is decreased.

The numerals in parentheses in the claims respectively indicate a relationship between the components and terms in the claims and the more concrete objects in the embodiment mentioned below.

BRIEF DESCRIPTION OF THE FIGURES

Objects, features, and advantages of the present disclosure will become more apparent from the following detailed description made with reference to the accompanying figures, in which.

DETAILED DESCRIPTION

First Embodiment

Figure 1:
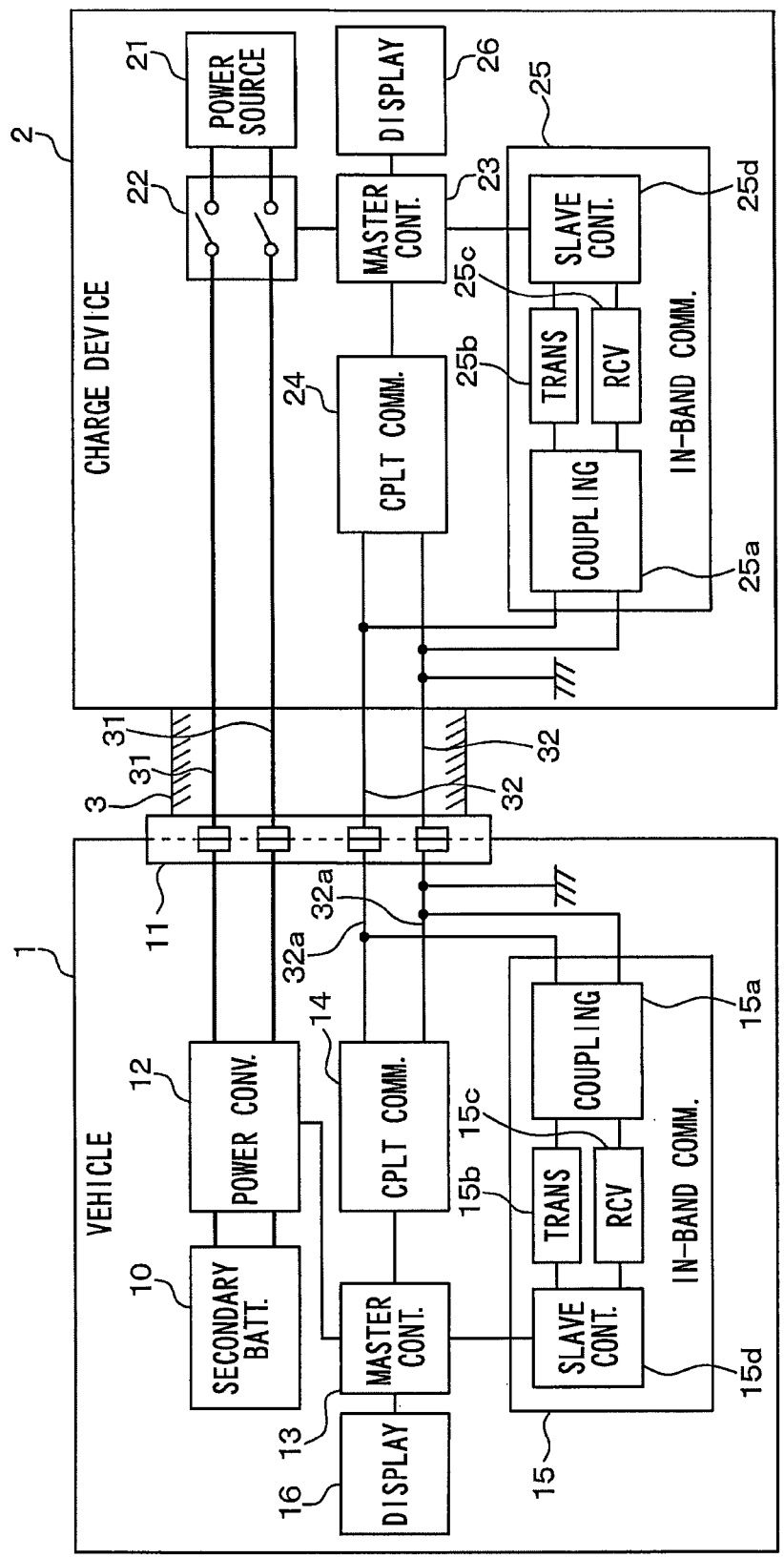
FIG. 1 is a block diagram of a vehicle charge system of the present disclosure.

Hereafter, the first embodiment of the present invention is described. As shown in FIG. 1, a vehicle charge system of the present embodiment includes a vehicle 1 and a charge device 2, and an electric power is supplied to the vehicle 1 from the charge device 2 via a charge cable 3. The charge cable 3 has both of a power line 31 for electric power supplies and a communication line 32 for CPLT communication and the in-band communication (mentioned later) built in the charge cable 3.

The vehicle 1 is equipped with an electric motor which generates the power for a travel of the "self-vehicle" 1, and a secondary battery 10 which supplies electric power to the electric motor concerned. Further, the vehicle 1 is provided with in-vehicle devices 11-16 for receiving the charge of the electric power to the secondary battery 10 concerned from the outside of the self-vehicle 1. Vehicles such as a plug-in hybrid vehicle, an electric vehicle, etc. are vehicles which receive, from an outside of the self-vehicle 1, the charge of the electric power to the secondary battery 10 which is a power source of the electric motor which generates a travel power of the self-vehicle 1.

Specifically, the in-vehicle devices 12-16 are a power converter 12, a master controller 13, a CPLT communicator 14, an in-band communicator 15, and a display 16.

A connector 11 is configured to enable electric power charging and signal communication between the vehicle 1 and the charge device 2 when the charge cable 3 is inserted thereinto.

The power converter 12 is a circuit that converts an electric power received via a power line 31 from the charge device 2, and charges the secondary battery 10, and the power converter 12 is controlled by the master controller 13.

The master controller 13 is a microcomputer that controls a charge operation for performing charging in an integrated manner.

The CPLT communicator 14, which may be an example of a pilot communicator of the in-vehicle apparatus, is a circuit that controls and detects the voltage level of the communication line 32, in order to notify or exchange charge progress notices with the charge device 2. As to the progress of charging, a connection and disconnection of the charge cable 3, a completion of charge preparation, a start/end of charging etc. may be exchanged.

More specifically, the CPLT communicator 14 is a device for performing a well-known CPLT (Control Pilot) communication via the communication line 32. The master controller 13 can detect the voltage of the communication line 32a via the CPLT communicator 14.

When the above-mentioned charge and CPLT communication are performed, the in-band communicator 15 is used as a circuit that multiplexes the information about the charge on the communication line 32 and transmits the information to the charge device 2, and is also used as a circuit to receives the information about the charge via the communication line 32 from the charge device 2. The in-band communicator 15 is, in other words, a circuit for performing the in-band communication via the communication line 32.

The in-band communicator 15 has a coupling circuit 15a, a transmitter circuit 15b, a receiver circuit 15c, and a slave controller 15d.

The coupling circuit 15a is a circuit that makes compatible the electrical properties of the two signals, i.e., (i) a signal output from and input to the communication line 32 and (ii) a signal output from and input to the transmitter circuit 15b and the receiver circuit 15c, which comprises a transformer and a capacitor.

The transmitter circuit 15b is a circuit which multiplexes an in-band signal on the communication line 32 via the coupling circuit 15a according to a control of the slave controller 15d.

The receiver circuit 15c is a circuit which receives the in-band signal multiplexed on the communication line 32 via the coupling circuit 15a and outputs the signal to the slave controller 15d.

The slave controller 15d encodes the transmission data that is outputted from the master controller 13 by a method, such as an OFDM (i.e., Orthogonal Frequency Division Multiplex method), and transmits the signal of the encoded result to the transmitter circuit 15b as an in-band signal.

Further, the slave controller 15d decodes the in-band signal outputted from the receiver circuit 15c by the OFDM, for example, and transmits the reception data obtained as a decoded result to the master controller 13.

The display 16 is a device which displays information for the user of the vehicle 1 in a visual form and/or in an audible form, according to a control of the master controller 13.

The charge device 2 has a power source 21, a switch 22, a master controller 23, a CPLT communicator 24, an in-band communicator 25, and a display 26.

The power source 21 is a device that receives a supply of electric power from an outside of the charge device, and outputs the electric power to the switch 22.

The switch 22 is switched according to a control of the master controller 23, to an ON and to an OFF, and enables a supply of the electric power from the power source 21 to the power line 31 at the time of ON, and intercepts the supply of the electric power from the power source 21 to the power line 31 at the time of OFF.

The master controller 23 is a microcomputer that controls a charge operation for performing charging in an integrated manner.

The CPLT communicator 24, which may be an example of a pilot communicator of the charge device, is a circuit that controls and detects the voltage level of the communication line 32, in order to notify or exchange charge progress notices regarding a charge procedure with the charge device 2.

More practically, the CPLT communicator 24 is a device for performing a well-known CPLT communication via the communication line 32. The master controller 23 can detects the voltage of the communication line 32 via the CPLT communicator 24.

The in-band communicator 25 is a circuit that multiplexes the information about the charge on the communication line 32 and transmits the signal to the vehicle 1 when the above-mentioned charge and CPLT communication are performed, and is also a circuit that receives the information about the charge from the in-band communicator 15 of the vehicle 1 via the communication line 32.

The in-band communicator 25 has a coupling circuit 25a, a transmitter circuit 25b, a receiver circuit 25c, and a slave controller 25d.

The coupling circuit 25a is a circuit that makes compatible the electrical properties of the two signals, i.e., (i) a signal output from and input to the communication line 32 and (ii) a signal output from and input to the transmitter circuit 25b and the receiver circuit 25c, which comprises a transformer and a capacitor.

The transmitter circuit 25b is a circuit which multiplexes an in-band signal on the communication line 32 via the coupling circuit 25a according to a control of the slave controller 25d.

The receiver circuit 25c is a circuit which receives the in-band signal multiplexed on the communication line 32 via the coupling circuit 25a and outputs the signal to the slave controller 25d.

The slave controller 25d encodes the transmission data that is outputted from the master controller 23 by a method, such as an OFDM (i.e., Orthogonal Frequency Division Multiplex method), and transmits the signal of the encoded result to the transmitter circuit 25b as an in-band signal.

Further, the slave controller 25d decodes the in-band signal outputted from the receiver circuit 25c by the OFDM, for example, and transmits the reception data obtained as a decoded result to the master controller 23.

The communication method used by the slave controller 15d and by the slave controller 25d is the same method.

The display 26 is a device which displays information for the user close to the charge device 2 in a visual form and/or in an audible form, according to a control of the master controller 23.

Here, the contents of the data exchanged between the master controller 13 and the slave controller 15d are described with reference to FIG. 2.

The master controller 13 repeatedly outputs a data transmission/reception instruction to the slave controller 15d, in order to perform the in-band communication. Further, when transmitting the data transmission/reception instruction, the master controller 13 outputs the transmission data to the slave controller 15d together with the data transmission/reception instruction concerned in case that the data to be transmitted is stored in the in-band communicator 15.

The slave controller 15d decodes an in-band signal by the above-mentioned preset communication method (e.g., OFDM) when the in-band signal is received from the communication line 32 via the coupling circuit 15a and the receiver circuit 15c.

After decoding the reception data extracted from the in-band signal concerned, the data is temporarily saved in a memory of a self-device (i.e., the vehicle 1).

Then, whenever the slave controller 15d receives the data transmission/reception instruction from the master controller 13, the reception data saved in the memory of the self-device (i.e., the vehicle 1) is output to the master controller 13, and, after such an output, the slave controller 15d deletes the reception data concerned from the memory of the self-device (i.e., the vehicle 1).

Further, the slave controller 15d encodes, whenever it receives the data transmission/reception instruction from the master controller 13, the transmission data concerned with the above-mentioned predetermined communication mode (e.g., OFDM), in case that the transmission data is contained in such data transmission/reception instruction. Then, the signal from the encoded result is transmitted onto the communication line 32 as an in-band signal using the transmitter circuit 15b and the coupling circuit 15a.

The master controller 13 outputs a reset signal to the slave controller 15d as required, which is mention later. When the reset signal is output, the slave controller 15d is/undergoes reset.

In the present embodiment, an "output of the reset signal" means that a reset signal line connecting the master controller 13 and the slave controller 15d is switched to an ON state, and the "reset signal is NOT output" means that a reset signal line connecting the master controller 13 and the slave controller 15d is switched to an OFF state.

Further, the data contents exchanged between the master controller 13 and the slave controller 15d and the operation contents of each of the master controller 13 and the slave controller 15d based on the data contents are the same, when the master controller 13 and the slave controller 15d are replaced with the master controller 23 and the slave controller 25d.

In such case, the coupling circuit 15a, transmitter circuit 15b, the receiver circuit 15c, and the in-band communicator 15 are respectively replaced with the coupling circuit 25a, transmitter circuit 25b, the receiver circuit 25c, and the in-band communicator 25.

Hereafter, the operation of the vehicle charge system in the present embodiment is described.

First, the procedure of charge and CPLT communication are described with reference to FIG. 3.

Figure 3:
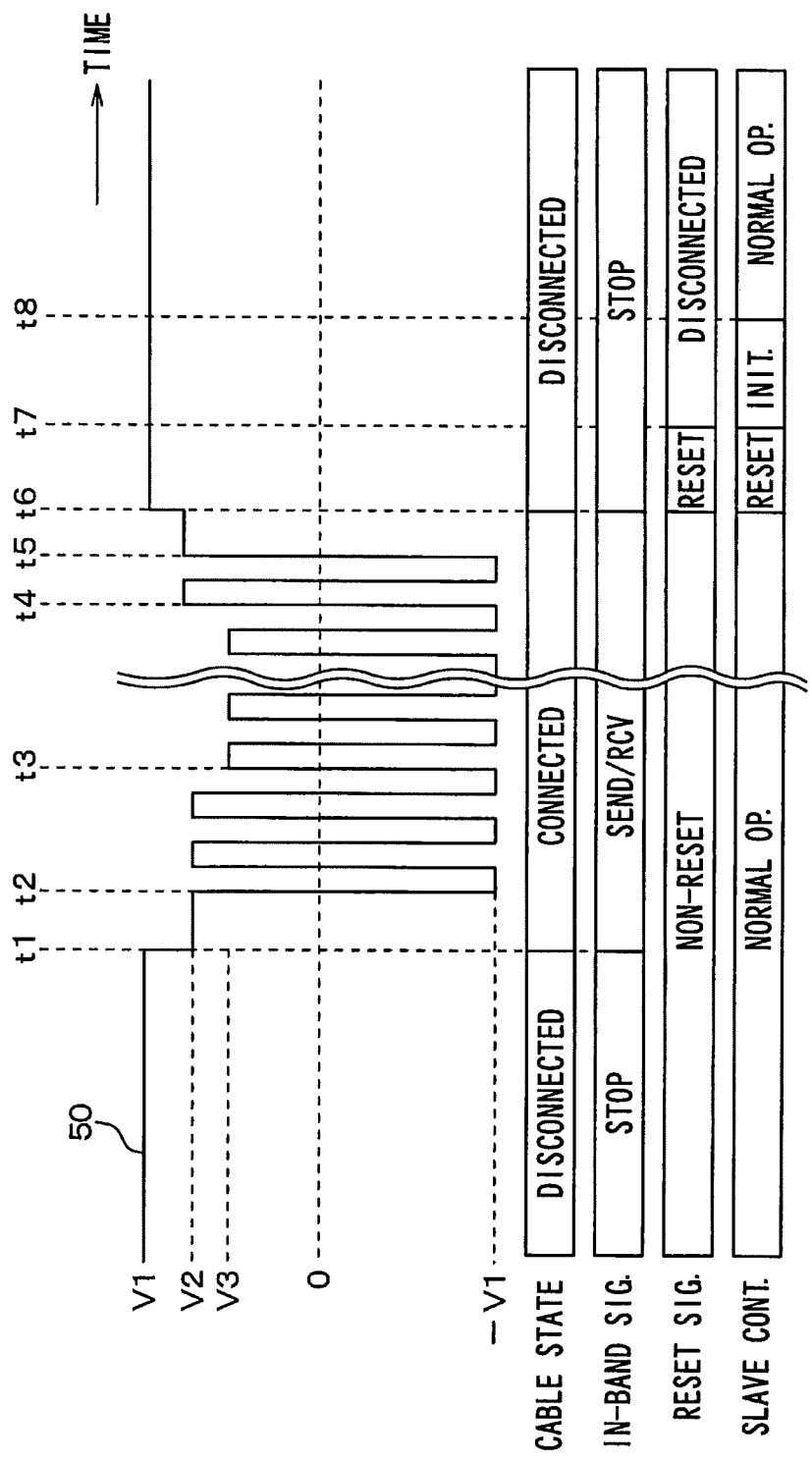
FIG. 3 is a state diagram of the slave controller along time transition.

FIG. 3 shows a diagram of a time transition of states of each of a voltage 50 of the communication line 32, the connection/disconnection state of the charge cable 3 and the connector 11, the state of transmission and reception of an in-band signal, the state of the above-mentioned reset signal, and the operation state of the slave controller 25d.

First, when the charge cable 3 is not connected to the connector 11, the CPLT communicator 24 of the charge device 2 maintains the voltage of the communication line 32 at V1 (e.g., +12 [V]), as shown in FIG. 3. At such time, the voltage of the communication line 32a between the CPLT communicator 14 of the vehicle 1 and the connector 11 is 0 [V].

At time t1, when the charge cable 3 is connected to the connector 11, which connects the communication line 32a and the communication line 32, resulting in, with an influence of an internal resistance (not illustrated) of the communication line 32a, a drop of the voltage of the communication line 32 from V1 to V2 (e.g., +9 [V]). The voltage of the communication line 32 may be designated hereinafter as a CPLT signal.

Then, the master controller 23 of the charge device 2 detects that the CPLT signal is set to V2 via, by way of, the CPLT communicator 24. When such a signal is detected, the master controller 23 starts to oscillate the CPLT signal so that the signal has a rectangular wave form having a Duty amplitude of −V1 (e.g., −12 [V]) to V2. The duty ratio of the rectangular wave is a value C2 which is not equal to 1. In this case, before the duty ratio is set to C2, the duty ratio is C1=1 since the CPLT signal was not oscillating.

The master controller 13 of the vehicle 1 detects that the CPLT signal starts to oscillate via the CPLT communicator 14, and, based on such detection, performs a preparation of charging (e.g., performs a control of the power converter 12).

If the charge preparation by the master controller 13 completes by time t3 after such a detection, the master controller 13 changes the size of the amplitude of the CPLT signal to −V1 to V3 (e.g., +6 [V]) by a method such as connecting a non-illustrated resistor to the communication line 32a. Simultaneously with it, the master controller 23 switches ON the switch 22, and an electric power is supplied to the power line 31 from the power source 21.

From such time t3, the electric power is supplied via the power line 31 from the power source 21, and charging is started therefrom.

Then, at time t4, when the charge rate of the secondary battery 10 becomes sufficient, the master controller 13 detects such a sufficient charge state via the power converter 12, and, based on such detection, changes the side of the amplitude of the CPLT signal to −V1 to V2.

Further, at time t4, the master controller 23, by switching OFF the switch 22, ends the charging from the power source 21 to the vehicle 1.

When the master controller 23 of the charge device 2 detects, via the CPLT communicator 24, that the size of the amplitude of the CPLT signal is changed to −V1 to V2, the master controller 23 interprets that a charge request from the vehicle 1 is diminished, and stops the oscillation of the CPLT signal at time t5. That is, the duty ratio of the CPLT signal returns from C2 to C1=1. Thereby, the level of the CPLT signal is maintained at V2 thereafter.

When the user pulls the charge cable 3 out from the connector 11 after time t5, the communication line 32 and the communication line 32a are put in an open state. As a result, the voltage of the communication line 32 returns to V1, and the voltage of the communication line 32a of the vehicle 1 becomes 0 [V].

Then, the voltage of the communication line 32 is maintained by V1, and the voltage of the communication line 32a of the vehicle 1 is maintained at 0 [V] until the charge cable 3 is inserted again into the connector 11. In such case, the Duty frequency of the CPLT signal in a period from time t2 to time t5 is about 1 kHz, for example.

On the other hand, the in-band signal of much higher frequency than 1 kHz is used in the communication method (e.g., OFDM) of the slave controller 15d and the slave controller 25d, and an encoding and decode method in such communication is much complicated.

Further, the master controller 13 of the vehicle 1 and the master controller 23 of the charge device 2 perform the in-band communication using the in-band communicator 15 and the in-band communicator 25, respectively, in a period from time t1 to time t6, i.e., while the charge cable 3 is connected to the connector 11.

Figure 4:
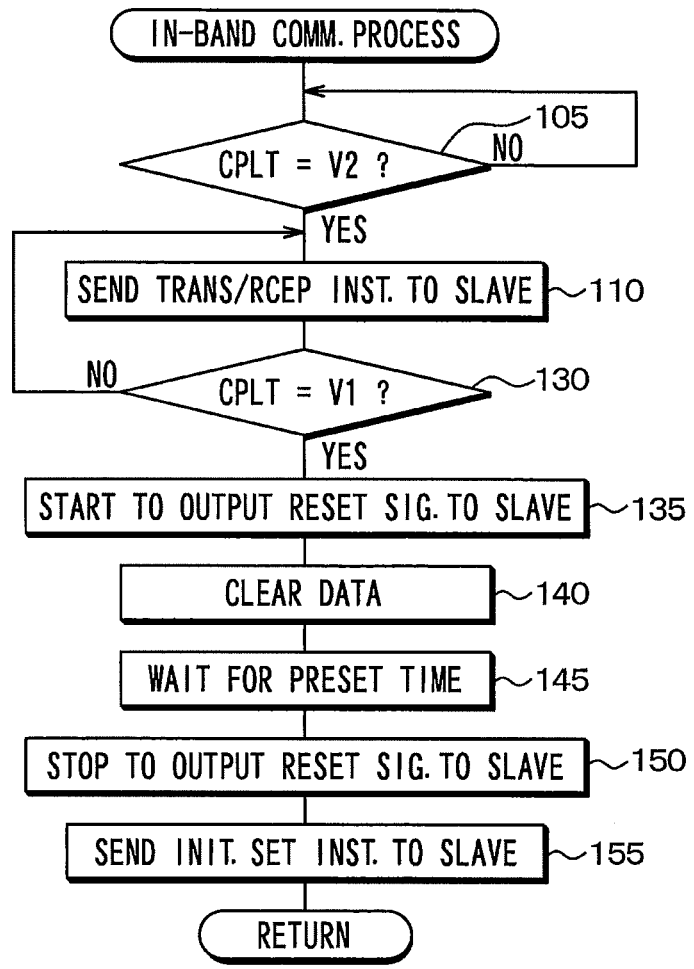
FIG. 4 is a flowchart of an in-band communication process.

In addition to the above-mentioned operation, the master controller 23 of the present embodiment always performs the in-band communication process shown in FIG. 4.

In the in-band communication, the master controller 23 determines, in Step 105, whether the voltage of the communication line 32 is V2, in a repeated manner, i.e., until it determines that the voltage is V2. Before time t1, i.e., during a period when the charge cable 3 is not connected to the connector 11, the determination that the voltage is not V2 is repeated in Step 105, since the voltage of the communication line 32 is, as mentioned above, V1.

Then, when the charge cable 3 is connected to the connector 11 at time t1, the voltage of the communication line 32 drops to V2 as mentioned above.

Figure 2:
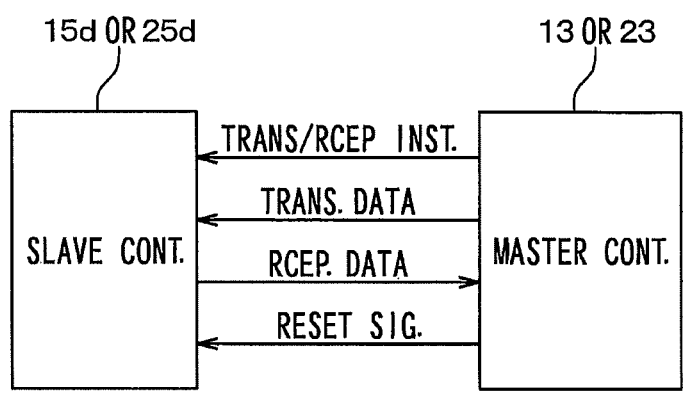
FIG. 2 is a diagram of data exchange performed between a slave controller and a master controller.

Then, the master controller 23 determines in Step 105 that the voltage is V2, proceeds to Step 110, and outputs the data transmission/reception instruction described in FIG. 2 to the slave controller 25d of the in-band communicator 25. Thereby, the master controller 23 can perform the in-band communication with the master controller 13 of the vehicle 1 via the communication line 32 using the in-band communicator 25 as described in FIG. 2.

As the data exchanged between the master controller 13 and the master controller 23 by the in-band communication, an SOC (State of Charge) which is a charge rate of the secondary battery 10, identification information of the vehicle 1, charge price information regarding the cost of charge, etc., may be considered, for example.

Subsequent to Step 110, the process proceeds to Step 130, and it is determined whether the voltage of the communication line 32 is V1. Just after the drop of the voltage of the communication line 32 at time t1, it is determined that the voltage is not V1, and the process returns to Step 110.

Therefore, in a period when the connector 11 is connected with the charge cable 3 and the voltage of the communication line 32 is not V1, i.e., a period from time t1 to time t6, the master controller 13 and the master controller 23 continue the in-band communication via the communication line 32.

Then, at time t6, if the charge cable 3 is pulled out from the connector 11 and the communication line 32 and the communication line 32a is put in an open state, the voltage of the communication line 32 becomes V1 as mentioned above.

Then, the master controller 23 determines that the voltage of the communication line 32 is V1 in Step 130, and the process proceeds to Step 135.

In Step 135, the master controller 23 resets the slave controller 25d by outputting a reset signal to the slave controller 25d. Specifically, the reset signal line which connects the master controller 23 and the slave controller 25d is switched from OFF to ON. In such case, before time t6, this reset signal line is maintained in an OFF state. Due to an output of this reset signal, all the processes (decode, encoding, etc.) for transmission and reception stop in the slave controller 25d, and the slave controller 25 is reset.

Thus, when the master controller 23 detects that (i) the charge cable 3 is pulled out from the connector 11, and (ii) the communication line 32 is in the open state based on the voltage of the communication line 32 being equal to V1, and resets the slave controller 25d according to a detection of such a state.

When the charge cable 3 is pulled out, the communication line 32 may be prone to have an external overriding noise. As mentioned above, since the encoding and decoding method of the slave controller 25d is enormously complicated, the slave controller 25d may malfunction due to the noise overriding on the communication line 32 from an outside thereof, i.e., during the in-band communication.

Therefore, a malfunction timing of the slave controller 25d may often be a timing when the charge cable 3 is pulled out from the connector 11 and the communication line 32 is put in the open state in many cases.

Thus, by resetting the slave controller 25d at such a timing, the malfunction of the slave controller 25d is efficiently resolved, and thereby reducing the frequency/the number of the disabled in-band communications due to the malfunction of the slave controller 25d.

In Step 140, subsequent to Step 135, the data relating to the in-band signal is cleared from among the data internally stored in the memory of the self-device (i.e., deleted). More specifically, all the data obtained from the slave controller 25d at the time of the in-band communication may be cleared (i.e., the reception data etc. which were obtained by the decoding of the slave controller 25d is cleared), and the transmission data created for an output from the master controller 23 to the slave controller 25d may be not cleared. Alternatively, in addition to the data obtained from the slave controller 25d at the time of the in-band communication, the transmission data may also be cleared.

The reason why the data related to the in-band signal is cleared is that it is highly possible that, in case the slave controller 25d was malfunctioning just before the resetting, the data obtained from such a malfunctioning slave controller 25d is erroneous data. If such erroneous data is used without discarding it, the master controller 23 performs an erroneous process.

Then, in Step 145, a preset wait time of, for example, 1 second is reserved with a continuation of an output of the reset signal, i.e., while the reset signal line is maintained in an ON state. Then, after a preset time, i.e., at time t7, the output of the reset signal is stopped in Step 150. That is, the reset signal line is switched from ON to OFF. When the output of the reset signal stops, the slave controller 25d returns to operate by rebooting itself.

Then, the master controller 23 outputs, in Step 155, an initialization instruction to the slave controller 25d. Upon receiving the initialization instruction, the slave controller 25d performs an initialization process (i.e., initialization processing), e.g. returning all the data in the memory of the self-device (i.e., the charge device 2) to an initial value. At the end of the initialization, i.e., after time t8, the slave controller 25d operates normally even if it was malfunctioning before the resetting. The process returns to Step 105 after Step 155.

As described above, the master controller 23 of the present embodiment resets the slave controller 25d (i.e., an example of a computer in the charge device 2), based on a fulfillment of the preset condition, i.e., based on a detection of the voltage of the communication line 32 by the CPLT communicator 24 to be equal to V1.

Therefore, in a situation where a malfunction of the slave controller 25d is highly possible, the frequency of the disabled in-band communication due to the malfunction of the slave controller 25d is decreased, by the reset of the slave controller 25d.

In the above-mentioned case of the present embodiment, a timing t6 when the charge cable 3 is pulled out from the connector 11 is a timing when the charging is complete and the in-band communication has ended. However, even if the timing when the charge cable 3 is pulled out from the connector 11 is a time when the charging from the charge device 2 to the secondary battery 10 is performed and when the in-band communication is performed, the operation of the master controller 23 is the same as the above. That is, at a timing when the charge cable 3 is pulled out from the connector 11, it is determined that the voltage of the communication line 32 becomes V1 in Step 130, proceeding to Step 135, and the reset signal is output to the slave controller 25d for the resetting thereof. The operation after Step 135 is also the same.

Among the charge cable pulled-out cases, it is more noise prone for the signal line 32 if the charge cable 3 is pulled out from the connector 11 at a time during the in-band communication and the time of encoding/decoding by the slave controller 25d.

Second Embodiment

The second embodiment of the present disclosure is described, with a focus on the difference from the first embodiment.

The master controller 23 of the present embodiment provides, in addition to the operation of the first embodiment, a notice for the user of the charge device 2 to pull the charge cable 3 out from the connector 11 based on a detected communication failure of the in-band communicator 25.

Figure 5:
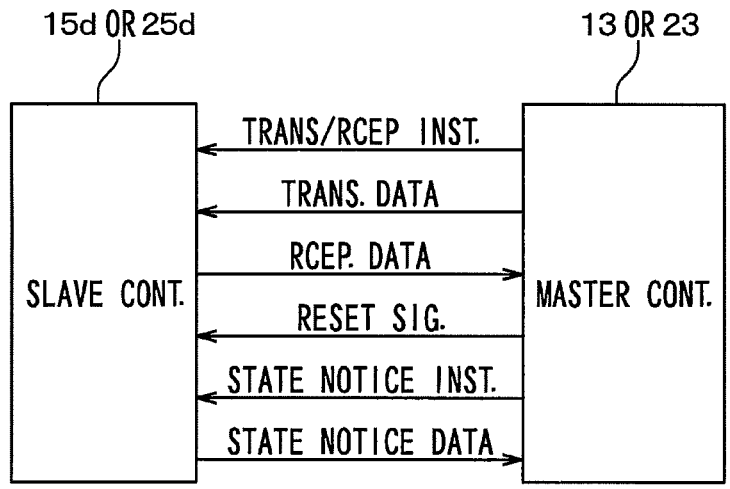
FIG. 5 is a diagram of data exchange performed between a slave controller and a master controller of the present disclosure.

The configuration of the vehicle charge system of the present embodiment is shown in FIG. 1, i.e., as the one same as the first embodiment. The data contents exchanged between the master controller 13 (or 23) and the slave controller 15d (or 25d) shown in FIG. 5. That is, in addition to the data exchanged in the first embodiment, a state notice instruction and state notice data are exchanged therebetween.

More specifically, during the operation of the master controller 13 and the slave controller 15d, the master controller 13 transmits a state notice instruction to the slave controller 15d periodically (e.g., in a cycle of 1 second), and the slave controller 15d outputs state notice data regarding the state of the self-device (i.e., the vehicle 1) to the master controller 13, upon receiving the state notice instruction.

Similarly, during the operation of the master controller 23 and the slave controller 25d, the master controller 23 transmits a state notice instruction to the slave controller 25d periodically (e.g., in a cycle of 1 second), and the slave controller 25d outputs the state notice data regarding the state of the self-device (i.e., the charge device 2) to the master controller 23 upon receiving the state notice instruction.

Here, in the state notice data outputted to the master controller 13 (or 23) from the slave controller 15d (or 25d), the state of an encoder and a decoder in the slave controller 15d (or 25d) (e.g., in a normal operation or in an erroneous operation etc.) is included. The encoder and the decoder are the components for encoding and decoding of the communication method (e.g., OFDM) for the in-band communication in the slave controller 15d (or 25d).

Figure 6:
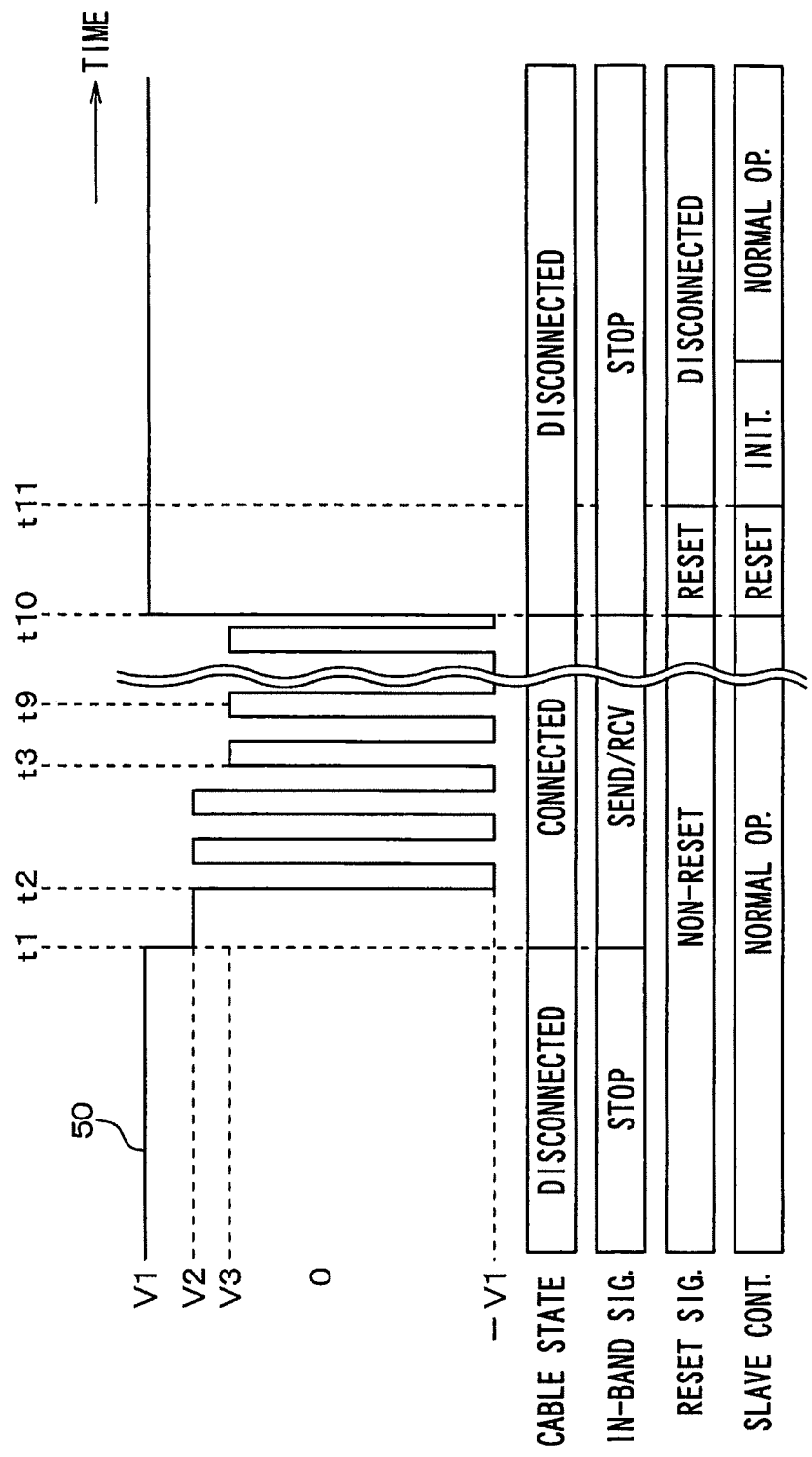
FIG. 6 is a state diagram of the slave controller along time transition.

FIG. 6 shows a time transition of the states regarding the voltage 50 of the communication line 32, the connection/disconnection state of the charge cable 3 and the connector 11, the state of transmission and reception of an in-band signal, the state of the above-mentioned reset signal, and the operation state of the slave controller 25d.

According to the present embodiment, when the communication of the in-band communicator 25 is in failure as shown in FIG. 6 in a period when the connector 11 is connected with the charge cable 3, the charge device 2 notifies the user that the charge cable 3 should be pulled out.

Hereafter, the operation of the vehicle charge system of the present embodiment is described with a focus on a difference from the first embodiment. The procedure of charging and CPLT communication are the same as the first embodiment.

Figure 7:
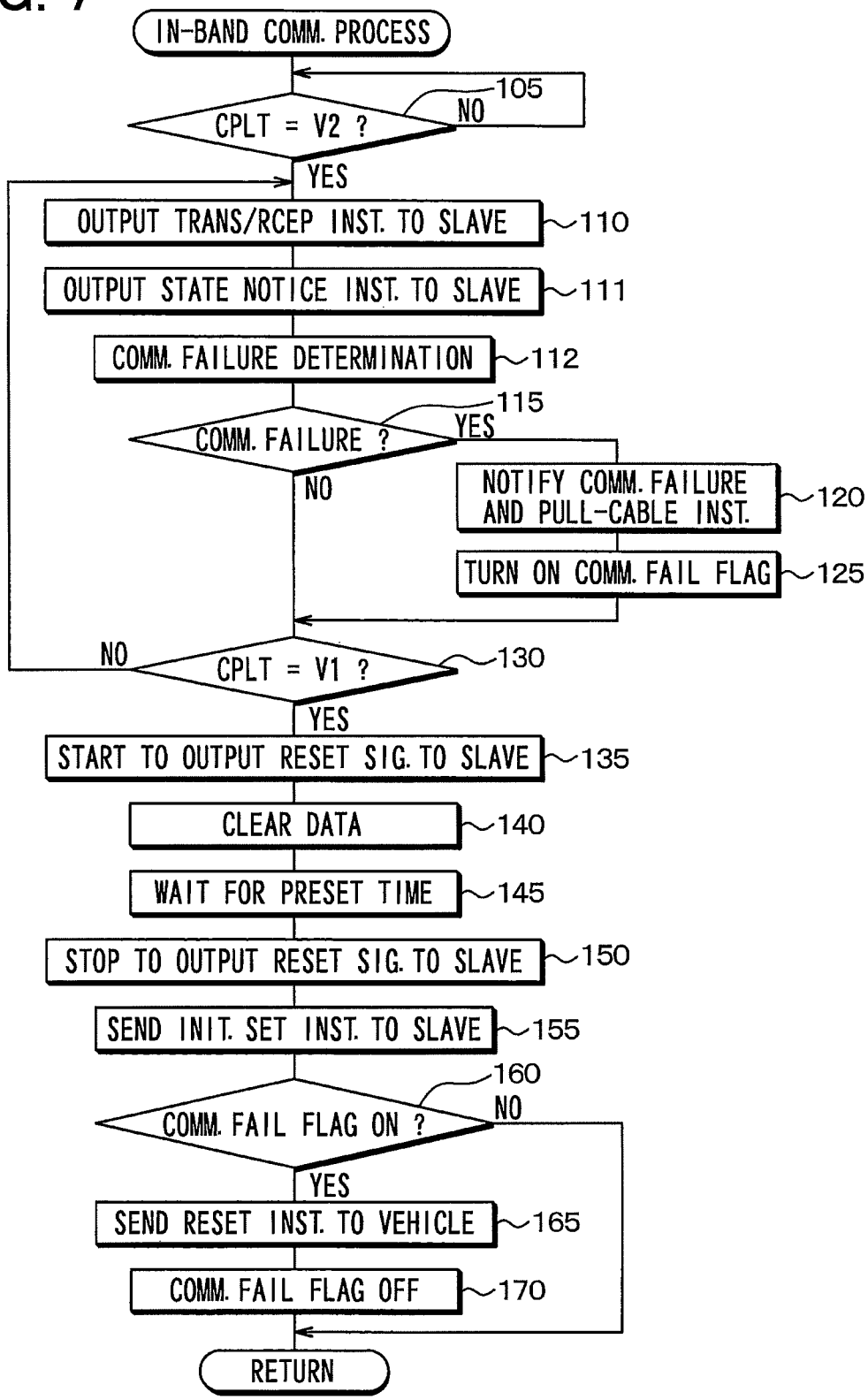
FIG. 7 is a flowchart of the in-band communication process.

Further, the master controller 23 of the present embodiment is configured to always perform an in-band communication process shown in FIG. 7, instead of performing the in-band communications process shown in FIG. 4. The process of FIG. 7 has, in addition to the processes of Steps 111-125, processes of Steps 160-165.

The operation before time t9 in FIG. 7 is the same as the first embodiment shown in FIG. 6. That is, the charge cable 3 and the connector 11 are in a disconnection state, and the master controller 23 repeats Step 105. Then, at time t1, the charge cable 3 is connected with the connector 11, and the voltage of the communication line 32 becomes V2, and the master controller 23, proceeding to Step 110, transmits the data transmission/reception instruction, thereby, the in-band communication is performed.

Subsequent to Step 110, the master controller 23 in Step 111 outputs the above-mentioned state notice instruction to the slave controller 25d. The above-mentioned state notice data is thereby usually received from the slave controller 25d.

Then, a communication failure determination is performed in Step 112. In the communication failure determination, it is determined, for example, whether an in-band communication disable state in which the in-band communication of the in-band communicator 25 is not performed is continuing for a preset time or more in Step 112a, first.

The in-band communication disable state may be, only a state D, or a state B and the state D, or a state C and the state D, or the states B, C, D, from among the following states of A to D.

State A: the in-band signal is transmittable and receivable;
State B: the in-band signal is not transmittable but is receivable;
State C: the in-band signal is transmittable but is not receivable; and
State D: the in-band signal is not transmittable and is not receivable.

Whether the in-band communicator 25 is in an in-band signal receivable state is determined based on whether the slave controller 25d outputs a transmission complete notice to the in-band communicator 25 when the master controller 23 outputs the data transmission/reception instruction to the slave controller 25d together with the transmission data.

Further, the in-band communicator 25 is in an in-band signal transmittable state is determined based on whether the slave controller 25d outputs a transmission complete notice to the in-band communicator 25 when the master controller 23 outputs the data transmission/reception instruction to the slave controller 25d together with the transmission data.

When it is determined that the in-band communication disable state of the in-band communicator 25 is continuing for the preset time or more, after proceeding to Step 112c, it is determined that the in-band communicator 25 is in a communication failure state, and a communication failure determination is ended.

When it is determined that the in-band communication disable state of the in-band communicator 25 is NOT continuing for the preset time or more, after proceeding to Step 112b, it is determined whether a communication failure notice is received from the slave controller 25d.

For example, when the above-described state notice data output from the slave controller 25d includes information that the encoder/decoder is in an erroneous operation state, such a state notice data is the communication failure notice.

When it is determined that the communication failure notice is received from the slave controller 25d, the process proceeds to Step 112c, and determines that the in-band communicator 25 is in the communication failure, and the communication failure determination is ended.

When it is determined that the communication failure notice is NOT received from the slave controller 25d, the process proceeds to Step 112d, and determines that the in-band communicator 25 is in a normal communication state, and the communication failure determination is ended.

Like Step 112a, a method of determining the communication failure when the in-band communication of the in-band communicator 25 is NOT performable for the preset time or more is beneficial, because such a method is not required to transmit the state notice instruction to the slave controller 25d for the determination of the communication failure.

Like Step 112b, a method of determining the communication failure of the in-band communicator 25 based on the communication failure notice from the slave controller 25d is beneficial, because such a method can quickly determine the communication failure without waiting for the preset time or more.

Subsequent to the communication failure determination in Step 112, the process in Step 115 determines whether the communication failure is caused, which branches to Step 120 if the failure is being caused, or branches to Step 130 if the failure is NOT caused.

At time t1 in this example, it is determined that the failure of communication is not yet caused, and the process proceeds to Step 130. Then, the processes of Step 130 to Step 155 are same as the first embodiment described above. After a drop of the voltage from V1 to V2 at time t1, the process in Step 130 determines that the voltage of the communication line 32 is not V1, and the process returns to Step 110.

Then, the CPLT communicator 14 sets the voltage of the communication line 32 to V3 at the time t3, and the charge is started, and then a loop of the processes of Steps 110, 112, 115 branching to Step 130 and returning to Step 110 is repeated, until the erroneous operation of the slave controller 25d is caused at time t9.

Then, at time t9, the communication failure is caused. Then, the master controller 23 determines the communication failure in either of Step 112a or 112b depending on the failure mode, to proceed to Step 112c to determine the communication failure.

Then, it is determined that the communication failure is caused in Step 115, and the process proceeds to Step 120.

In Step 120, a message showing the communication failure, and a message requesting the user to pull out the charge cable 3 are displayed on the display 26. When the user of the charge cable 3 looks at such messages, the user recognizes the communication failure, and he/she recognizes that it is requested that the charge cable 3 should be pulled out from the connector 11.

The master controller 23, proceeding to Step 125 after Step 120, sets a communication failure flag, and further proceeds to Step 130. In such case, an initial value of the communication failure flag is OFF, and is switched to ON only in Step 125.

Then, unless the in-band communicator 25 recovers from the communication failure state, the process of Steps 110, 115, 120, 125, and 130 is repeated up to time t10, i.e., until when the charge cable 3 is pulled out according to the above-mentioned message.

Then, at time t10, if the user pulls out the charge cable 3 according to the above-mentioned message, the voltage of the communication line 32 rises to V1 according to such action. Then, the master controller 23 in Step 130 determines that the voltage of the communication line 32 is V1, and the process further proceeds to Step 135. Steps 135-155 are the same as the first embodiment.

Therefore, the slave controller 25d resets according to the reset signal outputted from the master controller 23 (Step 135), and the data related to the in-band signal in the internal memory of the master controller 23 is cleared (Step 140).

Then, after a preset time from the start of such resetting (Step 145), the output of the reset signal stops at time t11 and the slave controller 25d starts to operate (Step 150), and the slave controller 25d performs the initialization (Step 155). Further, in Step 140, the master controller 23 is not cleared and maintains the communication failure flag as it is.

Subsequent to Step 155, the master controller 23 proceeds to Step 160, and determines whether the communication failure flag is ON.

In the present case, since the communication failure flag is ON, the process proceeds to Step 165 and a reset instruction is transmitted to the vehicle 1 by using the in-band communicator 25. In this reset instruction, the information about the communication failure of the in-band communicator 25 is included. Since the slave controller 25d has already recovered from the reset at such moment, the in-band communicator 25 can perform the in-band communication.

In the vehicle 1, the master controller 13 receives this reset instruction via the in-band communicator 15, and, according to the received reset instruction, a message is displayed on the display 16 showing that the in-band communicator 25 of the charge device 2 is reset due to having a communication failure caused therein. When the user of the vehicle 1 looks at such message, he/she recognizes that a reset is being performed.

Then, the master controller 13 performs processes equivalent to Steps 135 to 155 of FIG. 7 to the slave controller 15d. Therefore, the slave controller 15d resets according to the reset signal outputted from the master controller 13, and the data related to the in-band signal in the internal memory of the master controller 13 is cleared. Then, after a preset time from such resetting, the reset signal stops, and the slave controller 15d starts to operate, and the slave controller 15d performs the initialization.

When the slave controller 25d falls in the communication failure state, the in-band communicator 15 is highly likely to be falling in the communication failure state. Therefore, the master controller 23 not only resets the slave controller 25d, but also transmits an instruction to the master controller 13, instructing the controller 13 to reset the slave controller 15d.

In such manner, even when both of two slave controllers 15d and 25d are having the communication failure, the in-band communication is quickly resumed.

The master controller 23, subsequent to Step 165, proceeds to Step 170 to switch the communication failure flag to OFF, and returns to Step 105.

Third Embodiment

Next, the third embodiment of the present disclosure is described.

The present embodiment has a reset timing changed from the first/second embodiments, which is a timing for outputting a reset signal from the master controller 23 to the slave controller 25d.

Figure 9:
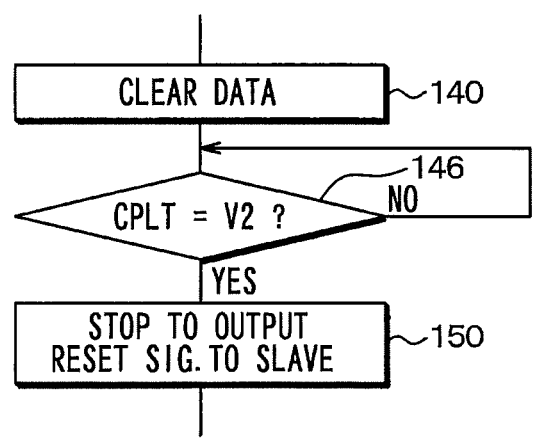
FIG. 9 is a flowchart of a part of the in-band communication process of the present disclosure.

For implementing such a change, the master controller 23 replaces the in-band communications process shown in FIG. 4 or 7 having Step 145 with the one having Step 146 in FIG. 9.

pair of the master controller 23 of the present embodiment, and it performs the in-band communications process which transposed Step 145 to Step 146 of FIG. 9.

Therefore, the master controller 23 in the present embodiment performs the following process at the timing of pulling out the charge cable 3, i.e., at time t6 in FIG. 3 in the first embodiment, or at time t10 in FIG. 6 in the second embodiment.

That is, it is determined first that the voltage of the communication line 32 becomes V1 in Step 130, in the same manner as the first and second embodiments, and then a reset signal is transmitted to the slave controller 25*d* in Step 135, and the data is cleared at Step 140 as already described.

Therefore, the slave controller 25*d* is reset at time t6 or at time t10, just like the first and second embodiments. Then, the process proceeds to Step 146, and the master controller 23 repeats a determination of whether the voltage of the communication line 32 has become V2 until it is determined that the voltage is V2.

Figure 10:
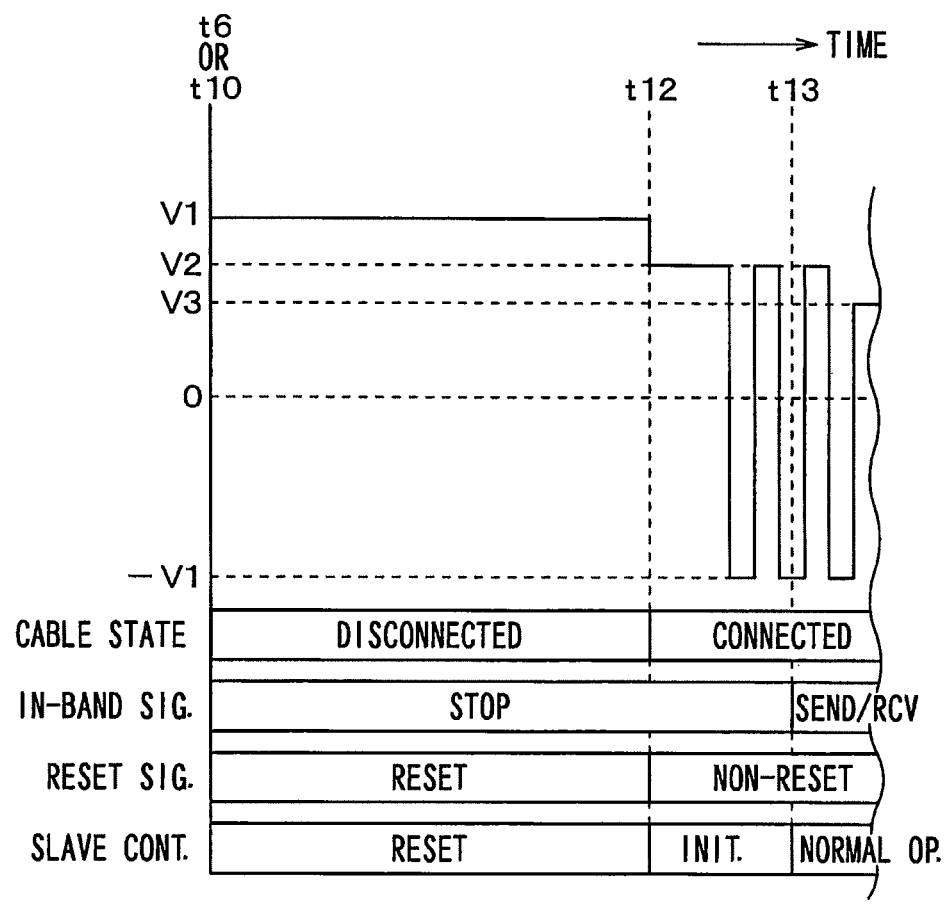
FIG. 10 is a state diagram of the slave controller along time transition.

While the charge cable 3 is not connected to the connector 11, and the communication line 32 is in an open state, the voltage of the communication line 32 stays at V1. Therefore, as shown in FIG. 10, while the communication line 32 is in the open state after time t6 or time t10, the communication line 32 continues to output a reset signal to the slave controller 25*d*. Thus, the slave controller 25*d* does not recover from resetting, i.e., stays in resetting state.

Then, at time t12, when the charge cable 3 is connected for charging to the connector 11, or to a connector that has the same configuration as the one in the vehicle 1 (i.e., to the connector having the same function as the connector 11), the CPLT communication starts at such a timing and the voltage of the communication line 32 falls to V2. Then, the master controller 23 in Step 146 determines that the voltage of the communication line 32 is V2, and the process proceeds to Step 150.

After Step 150, it is the same as described in the first and second embodiments. That is, in Step 150, the output of the reset signal to the slave controller 25*d* is stopped, and, as a result, the slave controller 25*d* recovers from resetting by the rebooting. Then, in Step 155, an initialization instruction is transmitted to the slave controller 25*d* from the master controller 23, and, as a result, the slave controller 25*d* performs the initialization. Then, the in-band communication is performed at a timing at or after time t13, that is, after the completion of the initialization.

The focus of the third embodiment is that, instead of performing the reset recovery and initialization in a connector disconnected state, i.e., when the charge cable 3 is not connected to the connector 11, in the first/second embodiment, the reset recovery and initialization are performed in a connector connected state.

Therefore, the recovery from resetting and initialization are performed at a CPLT communication timing, i.e., while the CPLT communication is performed, and may also be performed while the charge to the secondary battery 10 from the charge device 2 is performed depending on the timing or the required period of time of the reset or initialization.

While the CPLT communicator 24 detects that the communication line 32 is in an open state, the master controller 23 of the present embodiment, as described above, continues to output a reset signal for resetting the slave controller 25*d*. That is, the master controller 23 continues a switch ON state of the reset signal on the line 32 which connects the master controller 23 and the slave controller 25*d*.

When the communication line 32 is an open state in a disconnected state of the charge cable 3, the communication line 32 is easy to be overridden by the external noise from the outside thereof, and the slave controller 25*d* may malfunction relatively easily as a result.

Therefore, by putting/keeping the slave controller 25*d* in the reset state when the communication line 32 is in the open state, the frequency of disabled in-band communications due to the malfunction of the slave controller 25*d* is decreased at the timing when the charge cable 3 is later connected to the connector 11.

Fourth Embodiment

The fourth embodiment of the present disclosure is described with reference to the drawings. According to the present embodiment, the master controller 23 automatically resets the slave controller 25*d* based on the communication failure, in addition to the operation described in the second embodiment.

The configuration of the vehicle charge system of the present embodiment is the same as the one in FIG. 1, i.e., the same as the second embodiment. In the present embodiment, the data contents exchanged between the master controller 13 (or 23) and the slave controller 15*d* (or 25*d*) are the same as the second embodiment, as in FIG. 5.

Hereafter, the operation of the vehicle charge system of the present embodiment is described with a focus on a difference from the second embodiment. Regarding the procedure of charging and CPLT communication, the same steps are taken as the second embodiment.

Figure 11:
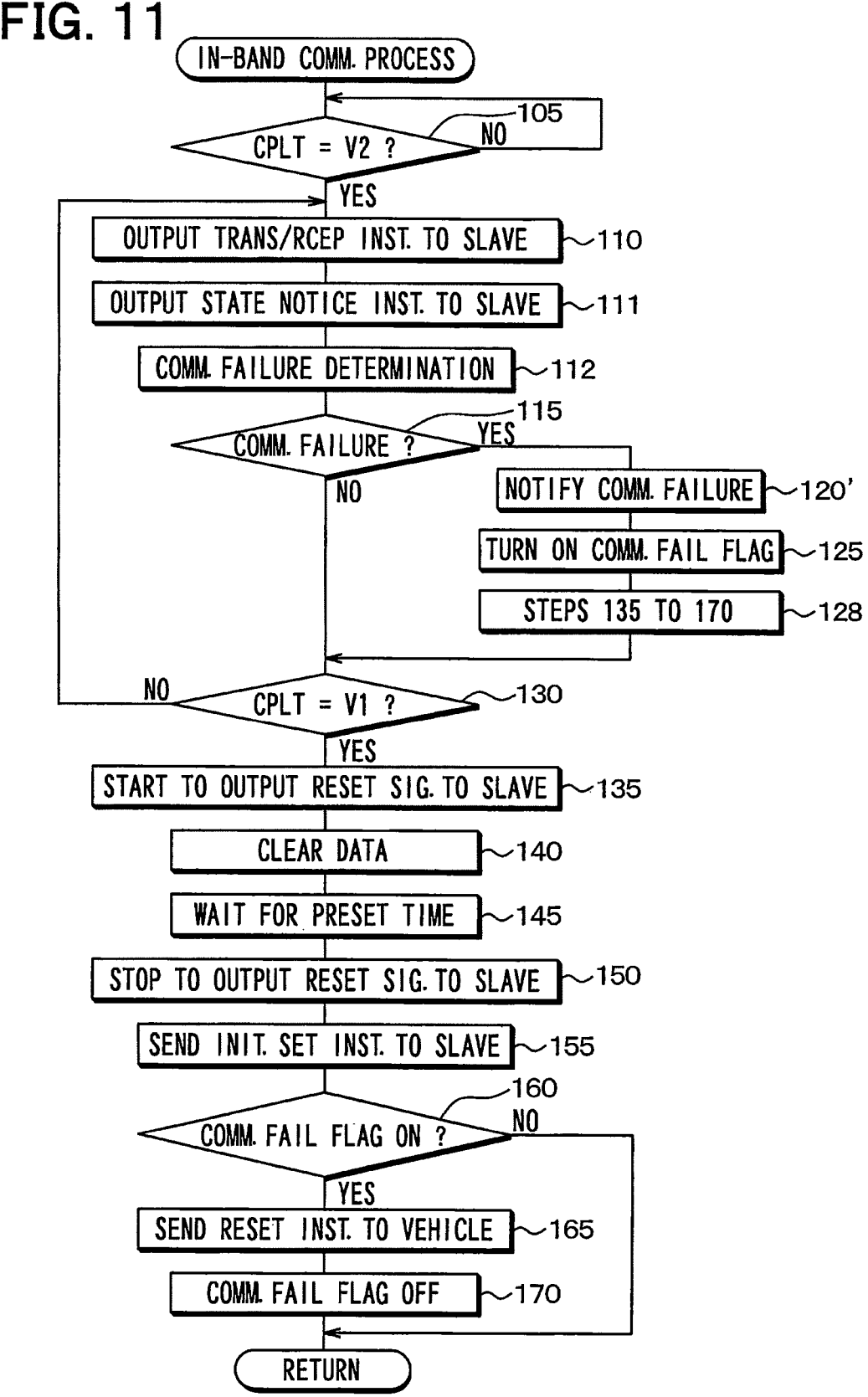
FIG. 11 is a flowchart of the in-band communication process of the present disclosure.

The master controller 23 of the present embodiment is configured to always perform the in-band communication process in FIG. 11, instead of performing the one in FIG. 7. The difference of the process in FIG. 11 from the one in FIG. 7 is, (i) a replacement of Step 120 with Step 120', and (ii) an addition of a new Step 128 after Step 125, which is executed before Step 130.

Figure 8:
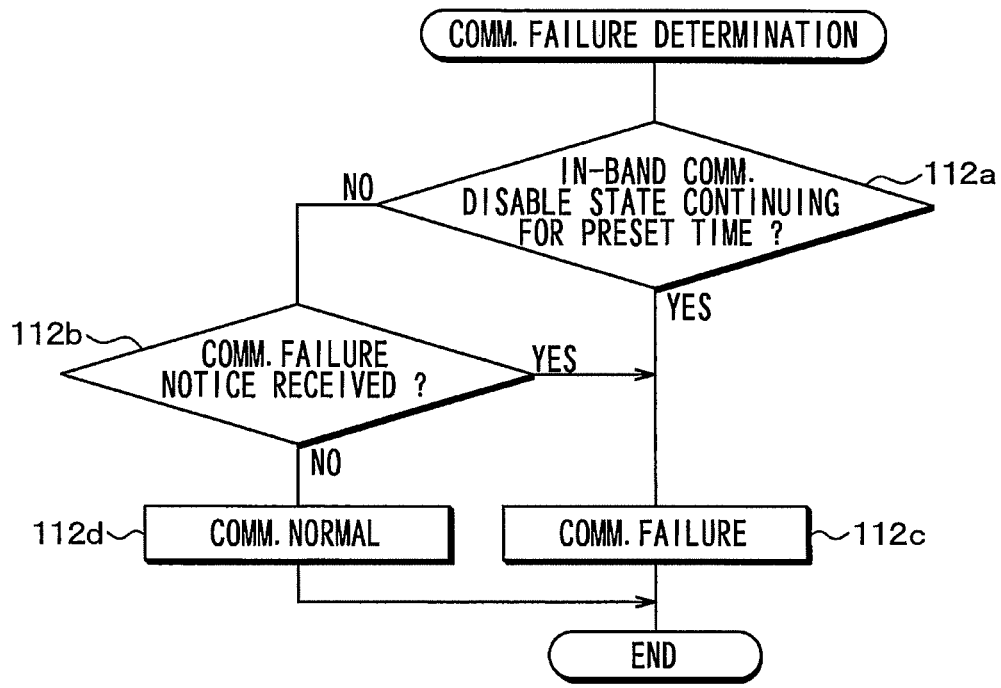
FIG. 8 is a flowchart of a communication failure determination process.

First, the operation until the communication failure occurs at time t9 (refer to FIG. 6) is the same as the second embodiment. When the communication failure occurs in the in-band communicator 25 at time t9, the master controller 23 determines YES in Step 112, i.e., in Step 112*a* or Step 112*b* in FIG. 8, and proceeds to Step 112*c*, and determines the communication failure.

Then, it is determined in Step 115 that the communication failure is caused, and the process proceeds to step 120'.

In Step 120', even though a message showing the communication failure is displayed on the display 26, without displaying a message requesting the user to pull out the charge cable 3. The former message will tell the user of the charge cable 3 that the communication failure is being caused.

The master controller 23 proceeds to Step 128 after Step 120'. In Step 128, a process realizing the same algorithm as a combination of Steps 135, 140, 145, 150, 155, 160, 165, and 170 is performed.

That is, a reset signal is output to the slave controller 25*d* by the same process as Step 135, and the data related to the in-band signal in the internal memory of the master controller 23 is cleared by the same process as Step 140, as described in the second embodiment.

Then, after waiting for a preset time by the same process as Step 145, the output of the reset signal to the slave controller 25*d* is stopped by the same process as Step 150, and an initialization instruction is output to the slave controller 25d by the same process as Step 155. The operation of the slave controller 25d at such timing is the same as the second embodiment.

Further, it is determined that the communication failure flag is ON by the same process as Step 160, and the master controller 23 transmits a reset instruction to the vehicle 1 using the in-band communicator 25 by the same process as Step 165, and the communication failure flag is switched to OFF by the same process as Step 170. The operation of the master controller 13 and other parts of the vehicle 1 at such timing is the same as the second embodiment. Then, the master controller 23 ends the process of Step 128, and proceeds to Step 130. The operation thereafter is the same as the second embodiment.

Thus, as described above, when the master controller 23 determines that the communication failure is caused in Step 115, the master controller 23 proceeds to Step 135 without waiting for the determination of Step 130, i.e., without waiting for a pull-out of the charge cable 3, and resets the slave controller 25d. That is, as a predetermined condition for resetting the slave controller 25d, a situation that the in-band communicator 25 is in the communication failure is adopted.

When the communication failure is caused in the slave controller 25d, the in-band communication is not performable any more, or, even if the in-band communication could ever be performed, the data from such communication is highly likely to be erroneous. Therefore, when the communication failure is caused in the slave controller 25d, the recovery of the in-band communication function is more quickly achieved by resetting the slave controller 25d, without waiting for a pull-out of the charge cable 3. As a result, the frequency of disabled in-band communications due to the malfunction of the slave controller 25d is decreased.

Fifth Embodiment

The fifth embodiment of the present disclosure is described with reference to the drawing. According to the present embodiment, the master controller 23 automatically resets the slave controller 25d based on the charge cable 3 being connected to the connector 11, in addition to the operation of the first to fourth embodiments.

Figure 12:
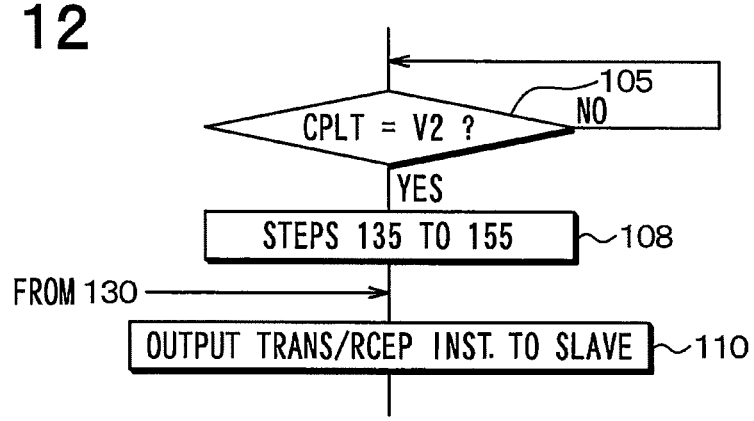
FIG. 12 is a flowchart of a part of the in-band communication process of the present disclosure.

Therefore, the master controller 23 of the present embodiment performs the in-band communication process in FIG. 12, which has Step 108 inserted in between Step 105 and Step 110, as a modification of the process in FIG. 4, 7, or 11.

That is, when the charge cable 3 is connected to the connector 11 and the voltage of the communication line 32 falls from V1 to V2, the master controller 23 determines that the voltage of the communication line 32 is V2 in Step 105, and proceeds to Step 108.

In Step 108, a process realizing the same algorithm as a combination of Steps 135, 140, 145, 150, and 155 is performed. That is, a reset signal is output to the slave controller 25d by the same process as Step 135, and the data related to the in-band signal in the internal memory of the master controller 23 is cleared by the same process as Step 140, as described in the first to fourth embodiments.

Then, after waiting for a preset time by the same process as Step 145, the output of the reset signal to the slave controller 25d is stopped by the same process as Step 150, and an initialization instruction is output to the slave controller 25d by the same process as Step 155. The operation of the slave controller 25d at such timing is the same as the first to fourth embodiments. The master controller 23 proceeds to Step 130 after Step 128. The operation thereafter is the same as the first to fourth embodiments.

Thus, the master controller 23 automatically proceeds to Step 135 and resets the slave controller 25d when the charge cable 3 is connected to the connector 11 and the voltage of the communication line 32 falls from V1 to V2. That is, as a predetermined condition for resetting the slave controller 25d, a situation that the charge cable 3 is connected to the connector 11 of the vehicle 1 is adopted.

In such case, if the reset of the slave controller 25d is performed immediately after connecting the charge cable 3 to the connector 11, it will take time for the slave controller 25d to reset, to recover, and to initialize.

However, as already described, the malfunction of the in-band communicator 25 is highly likely to be caused at a pull-out timing when the charge cable 3 is pulled out from the connector 11. Further, after the charge cable 3 is pulled out from the connector 11, a first start timing for starting the in-band communication for the first time is a timing of connecting the charge cable 3 to the connector 11.

Therefore, when the charge cable 3 is pulled out from the connector 11, even when the malfunction of the in-band communicator 25 is caused, it is OK to reset the slave controller 25d immediately after connecting the charge cable 3 to the connector 11. In such manner, an influence of the malfunction will not be exerted on the in-band communication thereafter.

Further, even when no malfunction is caused in the in-band communicator 25 by the pull-out of the charge cable 3 from the connector 11, a subsequent period also highly likely to be suffers from the malfunction of the in-band communicator 25, due to the open state of the communication line 32 until the next connection of the charge cable 3 to the connector 11.

Therefore, when the reset of the slave controller 25d is performed immediately after the connection of the charge cable 3 to the connector 11, such a malfunction described above is prevented from causing an influence on the in-band communication thereafter.

Sixth Embodiment

The sixth embodiment of the present disclosure is described with reference to the drawings.

Unlike the first to fifth embodiments, the master controller 23 in the present embodiment resets the slave controller 25d at a timing after connecting the charge cable 3 to the connector 11 and just before starting the in-band communication.

The configuration of the vehicle charge system of the present embodiment is the same as the one shown in FIG. 1, i.e., the same as the first embodiment. In the present embodiment, the data contents exchanged between the master controller 13 (or 23) and the slave controller 15d (or 25d) are also the same as the first embodiment as in FIG. 2.

Hereafter, the operation of the vehicle charge system of the present embodiment is described with a focus on a difference from the first embodiment. Regarding the procedure of charging and CPLT communication, the same steps are taken as the second embodiment.

Figure 13:
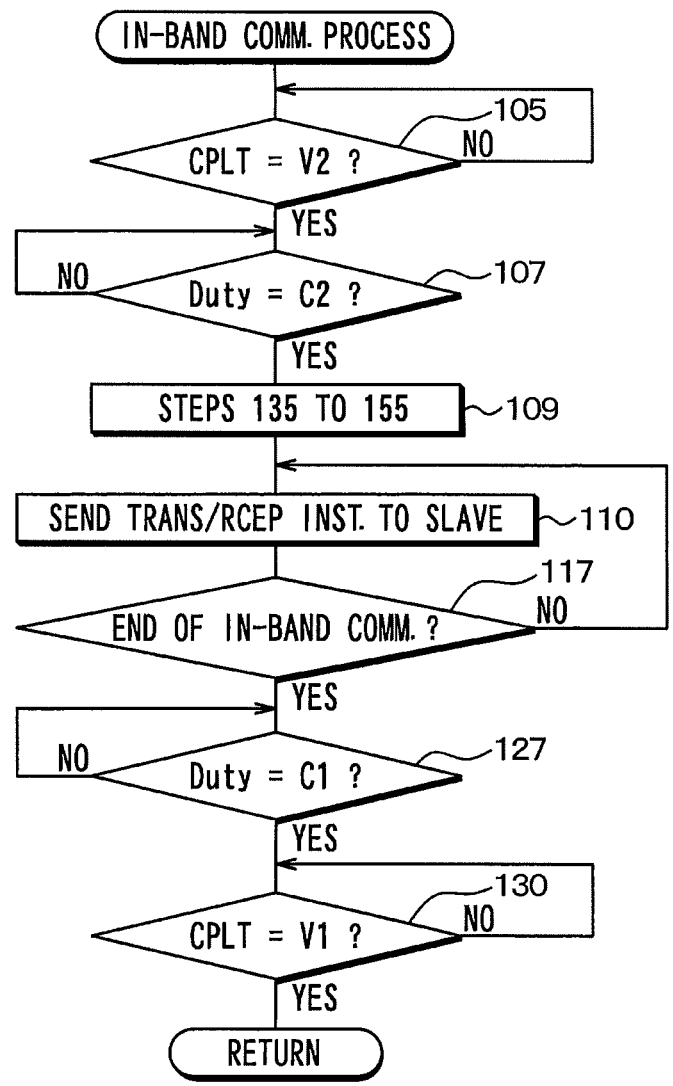
FIG. 13 is a flowchart of the in-band communication process of the present disclosure.

The master controller 23 of the present embodiment is configured to always perform the in-band communication process in FIG. 13, instead of performing the one in FIG. 4. The same processes respectively have the same numerals in FIGS. 4 and 13.

The in-band communication process shown in FIG. 13 starts with Step S105, performing a determination of whether the voltage of the communication line 32 is V2, which is repeated until it is determined that the voltage is V2. In a state where the charge cable 3 is not connected to the connector 11, since the voltage of the communication line 32 is V1 as mentioned above, the above determination of whether the voltage is not V2 in Step 105 is repeated.

In the meantime, when the charge cable 3 is connected to the connector 11, the voltage of the communication line 32 falls to V2 as mentioned above.

Then, it is determined by the master controller 23 that voltage is V2 in Step 105, and the process proceeds to Step 107, and the master controller 23 repeats a determination of whether a duty ratio of the CPLT signal (i.e., the voltage of the communication line 32) is C2, which is described in the first embodiment, until it is determined that the ratio is C2.

As described in the first embodiment, the master controller 23 controls the CPLT communicator 24 based on the fall of the voltage of the communication line 32 from V1 down to V2, and starts to oscillate the CPLT signal so that the duty ratio is changed from C1 to C2.

Therefore, immediately after the start of oscillation of the CPLT signal, the master controller 23 determines that the duty ratio of the CPLT signal is C2 in Step 107, and the process proceeds to Step 109.

In Step 109, a process realizing the same algorithm as Steps 135, 140, 145, 150, and 155 of FIG. 4 is performed.

That is, a reset signal is output to the slave controller 25d by the same process as Step 135, and the data related to the in-band signal in the internal memory of the master controller 23 is cleared by the same process as Step 140, as described in the first embodiment.

Then, after waiting for a preset time by the same process as Step 145, the output of the reset signal to the slave controller 25d is stopped by the same process as Step 150, and an initialization instruction is output to the slave controller 25d by the same process as Step 155. The operation of the slave controller 25d at such timing is the same as the first embodiment. The master controller 23 proceeds to Step 110 after Step 109.

Then, in Step 110, the data transmission/reception instruction described in FIG. 2 is output to the slave controller 25d of the in-band communicator 25 as described in the first embodiment.

Then, in Step 117, it is determined whether the in-band communication has ended. When it is determined that the in-band communication has not ended, the process returns to Step 110, and when it is determined that the in-band communication has ended, the process proceeds to Step 127.

Therefore, the in-band communication starts at a timing when the process proceeds from Step 109 to Step 110, and, unless it is determined that the in-band communication has ended, the in-band communication is continued in Step 110, which is repeatedly executed.

The master controller 23 determines, in the following manner, whether the in-band communication has ended in Step 117. That is, when the master controllers 13 and 23 both has transmitted and received a communication complete message with each other via the in-band communicators 15 and 25 in the in-band communication, the master controller 23 determines that the in-band communication has ended.

After the in-band communication has ended, the process proceeds to Step 127 from Step 117, and the master controller 23 repeats a determination of whether a duty ratio of the CPLT signal (i.e., the voltage of the communication line 32) is C1 as described in the first embodiment, until it is determined as C1.

Based on a rise of the voltage of the communication line 32 from V3 to V2, the master controller 23 controls the CPLT communicator 24, to terminate the oscillation of the CPLT signal so that the duty ratio is set to C1 from C2, as described in the first embodiment.

Therefore, immediately after ending the oscillation of the CPLT signal, the master controller 23 determines that the duty ratio of the CPLT signal is C1 in Step 109, and the process proceeds to Step 130.

In Step 130, it is determined whether the voltage of the communication line 32 is V1. Since the voltage of the communication line 32 rises from V2 to V1 when the charge cable 3 is pulled out, or is removed, from the connector 11 and the communication line 32 is put in an open state as described in the first embodiment, the master controller 23 determines, at such timing, that the voltage of the communication line 32 is V1, and returns to Step 105.

Thus, when the master controller 23 of the present embodiment detects that, based on the detection contents (i.e., the duty ratio is C2) of the CPLT communicator 24, a state for performing the in-band communication by the in-band communicator (25) is realized, the master controller 23 resets the slave controller 25d, before starting the communication by using the in-band communicator (25).

That is, as a preset condition for resetting the slave controller 25d, a situation that a state for performing the in-band communication by using the in-band communicator (25) is realized is adopted. In such manner, a frequency of a situation where the slave controller 25d is already malfunctioning at the time of starting the in-band communication is decreased.

Seventh Embodiment

The seventh embodiment of the present disclosure is described in the following with reference to the drawings.

According to the present embodiment, after the in-band communication has ended and before the charge cable 3 is pulled out from the connector 11, the slave controller 25d is reset, which is different from the operation in the first to sixth embodiments.

The configuration of the vehicle charge system of the present embodiment is the same as the one in FIG. 1, i.e., the same as the first embodiment. In the present embodiment, the data contents exchanged between the master controller 13 (or 23) and the slave controller 15d (or 25d) are the same as the first embodiment, as shown in FIG. 2.

Hereafter, the operation of the vehicle charge system of the present embodiment is described with a focus on a difference from the first embodiment. Regarding the procedure of charging and CPLT communication, the same steps are taken as the first embodiment.

Figure 14:
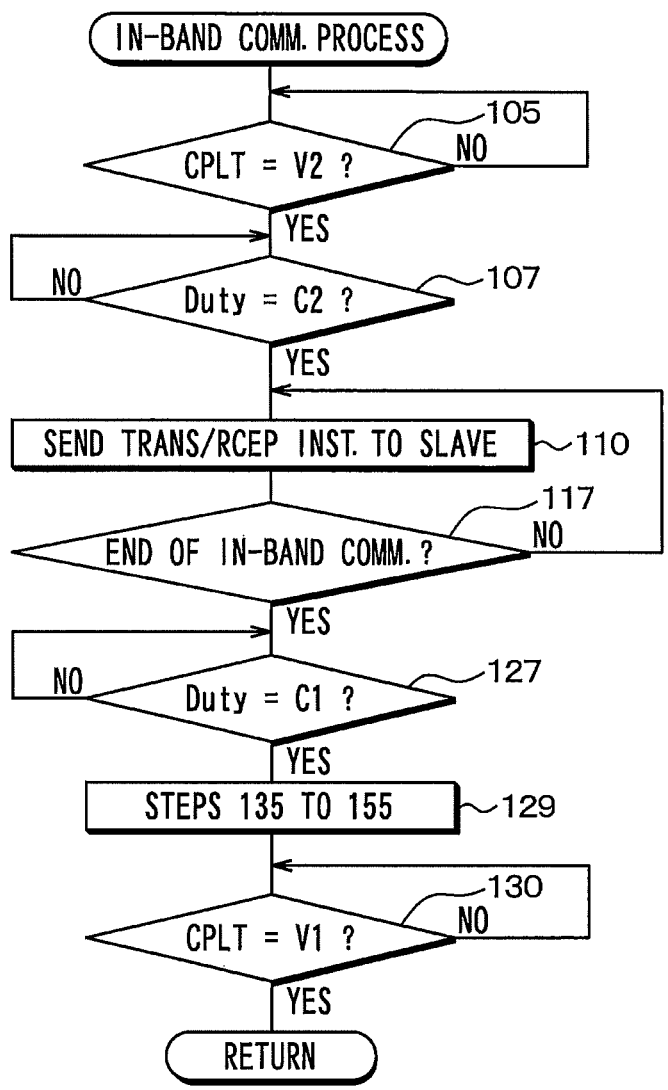
FIG. 14 is a flowchart of the in-band communication process of the present disclosure.

Further, the master controller 23 of the present embodiment is configured to always perform the in-band communication process in FIG. 14, instead of performing the one in FIG. 4. The same processes respectively have the same numerals in FIGS. 4 and 13.

The in-band communication process shown in FIG. 14 starts with Step S105, performing a determination of whether the voltage of the communication line 32 is V2, which is repeated until it is determined that the voltage is V2. In a state where the charge cable 3 is not connected to the connector 11, since the voltage of the communication line 32 is V1 as mentioned above, the above determination of whether the voltage is not V2 in Step 105 is repeated in the first place.

In the meantime, when the charge cable 3 is connected to the connector 11, the voltage of the communication line 32 falls to V2 as mentioned above.

Then, it is determined by the master controller 23 that voltage is V2 in Step 105, and the process proceeds to Step 107, and the master controller 23 repeats a determination of whether a duty ratio of the CPLT signal (i.e., the voltage of the communication line 32) is C2, which is described in the first embodiment, until it is determined that the ratio is C2.

As described in the first embodiment, the master controller 23 controls the CPLT communicator 24 based on the fall of the voltage of the communication line 32 from V1 down to V2, and starts to oscillate the CPLT signal so that the duty ratio is changed from C1 to C2.

Therefore, immediately after the start of oscillation of the CPLT signal, the master controller 23 determines that the duty ratio of the CPLT signal is C2 in Step 107, and the process proceeds to Step 110.

In Step 110, the data transmission/reception instruction described in FIG. 2 is output to the slave controller 25$d$ of the in-band communicator 25 as described in the first embodiment.

Then, in Step 117, it is determined whether the in-band communication has ended. Then, when it is determined that the communication has not ended, the process returns to Step 110, and when it is determined that the communication has ended, the process proceeds to Step 127. Therefore, the in-band communication starts at a timing when the process proceeds to Step 110, and, unless it is determined that the in-band communication has ended, the in-band communication is continued by repeating Step 110. The determination method for determining whether the in-band communication in Step 117 has ended is the same as the sixth embodiment.

After the in-band communication has ended, the process proceeds to Step 127 from Step 117, and the master controller 23 repeats a determination of whether the duty ratio of the CPLT signal (i.e., the voltage of the communication line 32) is C1 described originally in the first embodiment, until it is determined as C1.

Based on the rise of the voltage of the communication line 32 having risen from V3 to V2, the master controller 23 controls the CPLT communicator 24, and ends the oscillation of the CPLT signal so that the duty ratio is changed to C1 from C2, as described in the first embodiment.

Therefore, immediately after ending the oscillation of the CPLT signal, the master controller 23 determines that the duty ratio of the CPLT signal is C1 in Step 109, and the process proceeds to Step 129.

In Step 129, a process the same algorithm as a combination of Steps 135, 140, 145, 150, and 155 of FIG. 4 is performed.

That is, a reset signal is output to the slave controller 25$d$ by the same process as Step 135, and the data related to the in-band signal in the internal memory of the master controller 23 is cleared by the same process as Step 140, as described in the first embodiment.

Then, after waiting for a preset time by the same process as Step 145, the output of the reset signal to the slave controller 25$d$ is stopped by the same process as Step 150, and an initialization instruction is output to the slave controller 25$d$ by the same process as Step 155. The operation of the slave controller 25$d$ at such timing is the same as the first embodiment. The master controller 23 proceeds to Step 130 after Step 129.

In Step 130, it is determined whether the voltage of the communication line 32 is V1. Since the voltage of the communication line 32 rises from V2 to V1 when the charge cable 3 is pulled out, or is removed, from the connector 11 and the communication line 32 is put in an open state as described in the first embodiment, the master controller 23 determines, at such timing, that the voltage of the communication line 32 is V1, and returns to Step 105.

Thus, when the master controller 23 of the present embodiment detects that, based on the communication contents of the in-band communicator 25 (i.e., a transmission and reception of the communication complete message), the communication by using the in-band communicator 25 has ended, the master controller 23 resets the slave controller 25$d$ before the communication line 32 is put in the open state. That is, as a preset condition for resetting the slave controller 25$d$, a situation that a state that the in-band communication by using the in-band communicator 25 has ended is adopted. In such manner, the slave controller 25$d$ recovers from malfunction, before the pull-out of the charge cable 3 from the connector 11.

Eighth Embodiment

In the first to seventh embodiments, the operation of how the master controller 23 resets the slave controller 25$d$ in the charge device 2 is described, together with the operation relevant to it (see, FIG. 4, FIG. 7, FIG. 8, FIG. 9, FIG. 11, FIG. 12, FIG. 13, FIG. 14, respectively).

These operations can readily be used as the reset operation and its relevant operations by which the master controller 13 resets the slave controller 15$d$ in the in-vehicle apparatuses 11 to 16 of the vehicle 1.

In the description of the process of the master controller 23 shown in FIG. 4, FIG. 7, FIG. 8, FIG. 9, FIG. 11, FIG. 12, FIG. 13, and FIG. 14, if the following modification is devised, the operation of the master controller 13 for resetting the slave controller 15$d$ and the operation relevant to it are readily recognized.

(a) The subject of operation in FIG. 4, FIG. 7, FIG. 8, FIG. 9, FIG. 11, FIG. 12, FIG. 13, and FIG. 14 is switched to the master controller 13 from the master controller 23, and a controlled object is switched to the in-band communicator 15 and the display 16 from the in-band communicator 25 and the display 26.

(b) The output device of a reset signal is switched to the master controller 13 from the master controller 23, and a destination of the output is switched to the slave controller 15$d$ from the slave controller 25$d$.

(c) The determination contents in Step 105 are switched to "whether the voltage of the communication line 32$a$ is V2" from "whether the voltage of the communication line 32 is V2."

(d) The determination contents in Step 130 are switched to "whether the voltage of the communication line 32 is 0 [V]" from "whether the voltage of the communication line 32 is V1." This is because the communication line 32$a$ is put in an open state and the voltage becomes 0 [V], when the charge cable 3 is pulled out from the connector 11.

(e) The reset instruction transmitted in Step 165 is transmitted from the master controller 13 to the master controller 23, instead of being transmitted from the master controller 23 to the master controller 13.

Regarding the role of the CPLT communicator 14 and the in-band communicator 15 in the CPLT communication, as well as the role of the CPLT communicator 24 and the in-band communicator 25, they are maintained as unchanged from the first to seventh embodiments.

By implementing the above, the operation of modification of the first to seventh embodiments is realized, and, thereby achieving the same effects as the first to seventh embodiments for the master controller 13 and the in-band communicator 15.

As a technical matter 1, specifically as for the master controller 13, it resets the slave controller 15*d* (i.e., an example of a computer on the vehicle 1) that is included in the in-band communicator 15, based on the detection contents of the in-band communicator 15, the communication contents of the in-band communicator 15, or the operation states of the in-band communicator 15, i.e., when a preset condition is fulfilled for those factors.

That is, the master controller 13 provided separately from the in-band communicator 15 resets the slave controller 15*d* included in the in-band communicator 15 as required, based on the detection contents of the in-band communicator 15, the communication contents of the in-band communicator 15, or the operation states of the in-band communicator 15.

Therefore, in a situation where the slave controller 15*d* is highly likely to be malfunctioning, or in a situation where the required in-band communication is highly likely to be hindered/disabled if the slave controller 15*d* is malfunctioning, the slave controller 15*d* is reset. Thereby, the frequency of the disabled in-band communication due to the malfunction of the slave controller 15*d* is decreased.

Further, subsequent technical matters of 2 to 13 are also realized.

[Technical Matter 2] (Relevant to Modification of the First to Seventh Embodiments In the technical matter 1 described above, the master controller 13 further resets the slave controller 15*d* and clears the information obtained from the slave controller 15*d*, based on the preset condition for resetting the slave controller 15*d* being fulfilled.

[Technical Matter 3] (Relevant to Modification of the First to Fifth Embodiments)

In the technical matters 1 or 2, the master controller 13 further determines that the preset condition is fulfilled based on a detection that the communication line 32 is put in the open state (i.e., a detection that the communication line 32*a* is put in the open state) by the CPLT communicator 14.

[Technical Matter 4] (Relevant to Modification of the Third Embodiment)

In the technical matter 3, the master controller 13 further continues to output the reset signal for resetting the slave controller 15*d*, while the CPLT communicator 14 detects that the communication line 32 is in an open state.

[Technical Matter 5] (Relevant to Modification of the Second, Third and Fifth Embodiments)

In the technical matter 3 or 4, the master controller 13 further requests for the user of the vehicle 1 that the charge cable 3 should be disconnected based on the communication failure of the in-band communicator 15.

[Technical Matter 6] (Relevant to Modification of the Fourth Embodiment)

In any one of the technical matters 1 thru 4, the master controller 13 determines that the above-mentioned preset condition is fulfilled based on the communication failure of the in-band communicator 15.

[Technical Matter 7] (Relevant to Modification of the Second to Fifth Embodiments)

In the technical matter 5 or 6, the master controller 13 further determines that the in-band communicator 15 is in a communication failure state, in the following situations. That is:
 (i) when the in-band communicator 15 cannot perform transmission for a preset period,
 (ii) when the in-band communicator 15 cannot perform reception for a preset period, OR
 (iii) when the in-band communicator 15 cannot perform transmission nor reception for a preset period.

[Technical Matter 8] (Relevant to Modification of the Second to Fifth Embodiments)

In any one of the technical matters 5 thru 7, the master controller 13 further determines that the in-band communicator 15 is in a communication failure state based on a notice received from the slave controller 15*d*.

[Technical Matter 9] (Relevant to Modification of the Second to Fifth Embodiments)

In any one of the technical matters 5 thru 8, the master controller 13 further reports/notifies to an external device (outside of the vehicle 1) that the communication failure (of the communicator 15) based on the communication failure of the in-band communicator 15.

[Technical Matter 10] (Relevant to Modification of the Second to Fifth Embodiments)

In any one of the technical matters 5 thru 9, the master controller 13 further transmits a reset instruction after resetting the slave controller 15*d*, when the in-band communicator 15 falls in the communication failure state, in order to reset the slave controller 25*d* of the in-band communicator 25 which communicates with the in-band communicator 15 in the charge device 2.

[Technical Matter 11] (Relevant to Modification of the Fifth Embodiment)

In any one of the technical matters 1 thru 10, the master controller 13 further determines that the above-mentioned preset condition is fulfilled based on a detection by the CPLT communicator 14 that the charge cable 3 is connected to the vehicle 1.

[Technical Matter 12] (Relevant to Modification of the Sixth Embodiment)

In any one of the technical matters 1 thru 11, the master controller 13 further determines that the above-mentioned preset condition is fulfilled when the communication by using the in-band communicator 15 is in a performable state, based on the detection contents of the CPLT communicator 14, and resets the slave controller 15*d* before starting the communication by using the in-band communicator 15.

[Technical Matter 13] (Relevant to Modification of the Seventh Embodiment

In any one of the technical matters 1 thru 12, the master controller 13 further determines that the above-mentioned preset condition is fulfilled when the in-band communication using the in-band communicator 15 has ended based on the communication contents of the in-band communicator 15, and resets the slave controller 15*d* before putting the communication line 32 in the open state.

Other Embodiments

Although the present disclosure has been fully described in connection with preferred embodiment thereof with reference to the accompanying drawings, it is to be noted that various changes and modifications will become apparent to those skilled in the art.

Modification 1

For example, as a preset condition for resetting the slave controller 25*d*, the first to fifth embodiments use a condition A that the charge cable 3 is pulled out, and the fourth embodiment uses a condition B that the communication failure is caused in the in-band communicator 25. Further, the fifth embodiment uses a condition C that the charge cable 3 is connected to the connector 11, and the sixth embodiment uses a condition D that (a timing is) after the connection of the charge cable 3 and before the start of the in-band communication. Further, the seventh embodiment uses a condition E that (a timing is) after the start of the in-band communication and before the pull-out of (the cable 3 from) the connector 11.

These conditions A to E may also be used in a different manner, i.e., in a different combination from the one described above.

Modification 2

In each of the above-mentioned embodiments, after the master controller 23 resets the slave controller 25*d* and outputs an initialization instruction, the self-device (i.e., the master controller 23) may also be reset.

By such operation, even when the master controller 23 is also malfunctioning due to the malfunction of the master controller 23, the master controller 23 is highly likely to operate normally after resetting and rebooting.

Modification 3

The modification 1 and the modification 2 described above may also be operable even when the master controller 23 is read as/replaced with the master controller 13, and the in-band communicator 25 is read as/replaced with the in-band communicator 15, and the slave controller 25*d* is read as/replaced with the slave controller 15*d*, just like the eighth embodiment.

Such changes, modifications, and summarized schemes are to be understood as being within the scope of the present disclosure as defined by appended claims.

What is claimed is:

1. A charge device that performs a communication with a vehicle via a communication line in a charge cable, the charge cable having (i) a built-in power line to provide an electric power to the vehicle for charging a secondary battery of the vehicle and (ii) the built-in communication line, the charge device comprising:
    a pilot communicator controlling and detecting a voltage level of the communication line to exchange charge progress notices with the vehicle to control a charge operation;
    an in-band communicator sending and receiving charge information to and from the vehicle via the communication line, the charge information multiplexed with other signals on the communication line; and
    a master controller controlling the in-band communicator, wherein
    the master controller resets a slave controller included in the in-band communicator of a charge device based on a fulfillment of a preset condition regarding
    (i) detection contents of the pilot communicator,
    (ii) communication contents of the in-band communicator, or
    (iii) an operation state of the in-band communicator.

2. The charge device of claim 1, wherein
the master controller resets the slave controller on the charge device and clears information obtained from the slave controller on the charge device based on the fulfillment of the preset condition.

3. The charge device of claim 1, wherein
the master controller determines that the preset condition is fulfilled based on a detection of an open state of the communication line by the pilot controller.

4. The charge device of claim 3, wherein
the master controller continues to output a reset signal to reset the slave controller on the charge device while the pilot controller is detecting the open state of the communication line.

5. The charge device of claim 3, wherein
the master controller prompts a user to disconnect the charge cable based on a communication failure of the in-band communicator.

6. The charge device of claim 1, wherein
the master controller determines that the preset condition is fulfilled based on a communication failure of the in-band communicator.

7. The charge device of claim 5, wherein
the master controller determines the communication failure of the in-band communicator when, in a case that the in-band communicator is not capable of sending information for a preset time, (i) the in-band communication is not capable of receiving information for the preset time or (ii) the in-band communication is not capable of both sending information and receiving information for the preset time.

8. The charge device of claim 5, wherein
the master controller determines the communication failure of the in-band communicator based on a notice received from the slave controller on the charge device.

9. The charge device of claim 5, wherein
the master controller sends a notice of the communication failure to an external device based on the communication failure of the in-band communicator.

10. The charge device of claim 5, wherein
the master controller sends, after resetting the slave controller on the charge device, a reset instruction by using the in-band communicator to reset a slave controller on the vehicle that communicates with the in-band communicator in case of the communication failure of the in-band communicator.

11. The charge device of claim 1, wherein
the master controller determines that the preset condition is fulfilled based on a detection of the pilot communicator that the charge cable is connected to the vehicle.

12. The charge device of claim 1, wherein
the master controller (i) determines that the preset condition is fulfilled when a communication by using the in-band communicator is detected to be in a startable state based on the detection contents of the pilot communicator, and (ii) resets the slave controller on the charge device before starting the communication by using the in-band communicator.

13. The charge device of claim 1, wherein
the master controller (i) determines that the preset condition is fulfilled when an end of the communication by using the in-band communicator is detected based on the communication contents of the in-band communicator, and (ii) resets the slave controller on the charge device before the communication line is opened.

14. An in-vehicle apparatus communicating with a charge device on a vehicle having a secondary battery, the communication between the apparatus and the charge device performed via a communication line that is built in a charge cable together with a power line that is used for receiving an electric power for charging the secondary battery from the charge device, the in-vehicle apparatus comprising:
- a pilot communicator controlling and detecting a voltage level of the communication line to exchange charge progress notices with the charge device to control a charge operation;
- an in-band communicator sending and receiving charge information to and from the charge device via the communication line, the charge information multiplexed with other signals on the communication line; and
- a master controller controlling the in-band communicator, wherein
- the master controller resets a slave controller included in the in-band communicator on the vehicle based on a fulfillment of a preset condition regarding
- (i) detection contents of the pilot communicator,
- (ii) communication contents of the in-band communicator, or
- (iii) an operation state of the in-band communicator.

* * * * *